(12) United States Patent
Karles et al.

(10) Patent No.: US 11,317,654 B2
(45) Date of Patent: May 3, 2022

(54) ADDITIVE ASSEMBLY FOR ELECTRONIC VAPING DEVICE

(71) Applicant: Altria Client Services LLC, Richmond, VA (US)

(72) Inventors: Georgios Karles, Richmond, VA (US); Tracy M. Ogbonlowo, Moseley, VA (US); Danielle Crawford, Chester, VA (US); San Li, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 599 days.

(21) Appl. No.: 16/252,909

(22) Filed: Jan. 21, 2019

(65) Prior Publication Data

US 2019/0166902 A1 Jun. 6, 2019

Related U.S. Application Data

(63) Continuation of application No. 15/204,361, filed on Jul. 7, 2016, now Pat. No. 10,212,964.

(51) Int. Cl.
*A24F 40/485* (2020.01)
*A24B 15/167* (2020.01)
(Continued)

(52) U.S. Cl.
CPC ............ *A24F 40/485* (2020.01); *A24B 15/16* (2013.01); *A24B 15/167* (2016.11);
(Continued)

(58) Field of Classification Search
None
See application file for complete search history.

(56) References Cited

U.S. PATENT DOCUMENTS 3,679,625 A * 7/1972 Merrill ................. A24B 15/246
523/100
3,738,374 A * 6/1973 Bennett ................ A24B 15/165
131/359

(Continued)

FOREIGN PATENT DOCUMENTS

CN 1123118 A 5/1996
CN 1256099 A 6/2000
(Continued)

OTHER PUBLICATIONS

Russian Notice of Allowance and Search Report dated Sep. 15, 2020 for corresponding Russian Application No. 2019103104 and English translation thereof.
(Continued)

*Primary Examiner* — Thor S Campbell
(74) *Attorney, Agent, or Firm* — Harness, Dickey & Pierce, P.L.C.

(57) ABSTRACT

An additive assembly for an e-vaping device includes an adsorbent material that includes adsorbed carbon dioxide. The additive assembly may be in fluid communication with a vaporizer assembly that forms a generated vapor. The adsorbent material may release the carbon dioxide into the generated vapor based on at least a portion of the generated vapor adsorbing on the adsorbent material. The additive assembly may include a flavor material including a flavorant. The adsorbent material may generate heat based on at least a portion of the generated vapor adsorbing on the adsorbent material, and the flavor material may release flavorant into the generated vapor based at least in part on the heat generated by the adsorbent material. One or more of the adsorbent material and the flavor material may be included in beads. Adsorbent material and flavor material
(Continued)

may be included in multiple additive structures within the additive assembly.

14 Claims, 6 Drawing Sheets

(51) Int. Cl.
    *A24B 15/16*    (2020.01)
    *A24B 15/28*    (2006.01)
    *B01J 20/28*    (2006.01)
    *B01J 20/10*    (2006.01)
    *B01J 20/18*    (2006.01)
    *B01J 20/20*    (2006.01)

(52) U.S. Cl.
    CPC ............ *A24B 15/284* (2013.01); *B01J 20/103* (2013.01); *B01J 20/18* (2013.01); *B01J 20/20* (2013.01); *B01J 20/28016* (2013.01)

(56) References Cited

U.S. PATENT DOCUMENTS

| | | | |
|---|---|---|---|
| 3,828,801 A * | 8/1974 | Merrill | A24B 15/246 131/332 |
| 4,258,729 A * | 3/1981 | de la Burde | A24B 3/182 131/291 |
| 4,924,883 A | 5/1990 | Perfetti et al. | |
| 5,067,499 A | 11/1991 | Banerjee et al. | |
| 5,240,016 A | 8/1993 | Nichols et al. | |
| 8,499,766 B1 * | 8/2013 | Newton | A24F 40/40 131/273 |
| 8,960,199 B2 | 2/2015 | Zhuang et al. | |
| 9,004,073 B2 | 4/2015 | Tucker et al. | |
| 9,603,386 B2 * | 3/2017 | Xiang | A24F 40/50 |
| 9,675,114 B2 * | 6/2017 | Timmermans | A24F 40/50 |
| 9,808,032 B2 * | 11/2017 | Yamada | H05B 3/0014 |
| 2004/0016436 A1 * | 1/2004 | Thomas | A24D 3/022 131/202 |
| 2007/0000505 A1 * | 1/2007 | Zhuang | A24D 3/06 131/342 |
| 2007/0235046 A1 * | 10/2007 | Gedevanishvili | A24D 3/046 131/200 |
| 2007/0283972 A1 * | 12/2007 | Monsees | A24D 1/14 131/273 |
| 2008/0135060 A1 * | 6/2008 | Kuo | B01J 20/265 131/332 |
| 2008/0241255 A1 | 10/2008 | Rose et al. | |
| 2009/0044816 A1 * | 2/2009 | Rasouli | A24D 1/002 131/274 |
| 2009/0095287 A1 * | 4/2009 | Emarlou | A61M 11/041 128/200.14 |
| 2009/0288672 A1 * | 11/2009 | Hutchens | A24D 3/10 131/341 |
| 2010/0200006 A1 * | 8/2010 | Robinson | A24B 13/02 131/194 |
| 2010/0200008 A1 | 8/2010 | Taieb | |
| 2010/0313901 A1 * | 12/2010 | Fernando | A24F 40/95 131/330 |
| 2011/0036346 A1 * | 2/2011 | Cohen | A24F 40/40 128/200.14 |
| 2011/0226236 A1 * | 9/2011 | Buchberger | A61K 31/465 128/200.23 |
| 2012/0024304 A1 * | 2/2012 | Sebastian | D01F 2/28 131/332 |
| 2012/0048266 A1 * | 3/2012 | Alelov | A24F 40/50 128/202.21 |
| 2013/0042865 A1 * | 2/2013 | Monsees | A24F 40/90 128/203.27 |
| 2013/0104916 A1 * | 5/2013 | Bellinger | A61M 15/06 131/328 |
| 2013/0152956 A1 * | 6/2013 | von Borstel | A61P 25/34 131/329 |
| 2013/0192619 A1 | 8/2013 | Tucker et al. | |
| 2013/0284192 A1 * | 10/2013 | Peleg | A24F 40/65 131/329 |
| 2013/0319440 A1 * | 12/2013 | Capuano | A61M 15/06 131/329 |
| 2013/0340775 A1 * | 12/2013 | Juster | A24F 40/65 131/273 |
| 2014/0053856 A1 * | 2/2014 | Liu | A24F 40/60 131/329 |
| 2014/0096782 A1 * | 4/2014 | Ampolini | A24F 40/60 131/328 |
| 2014/0107815 A1 * | 4/2014 | LaMothe | A24F 40/65 700/90 |
| 2014/0123989 A1 * | 5/2014 | LaMothe | H05B 3/44 131/328 |
| 2014/0123990 A1 * | 5/2014 | Timmermans | A24F 40/60 131/328 |
| 2014/0166029 A1 | 6/2014 | Weigensberg et al. | |
| 2014/0174459 A1 * | 6/2014 | Burstyn | A24F 40/50 131/273 |
| 2014/0190496 A1 * | 7/2014 | Wensley | A24B 15/167 131/273 |
| 2014/0209105 A1 * | 7/2014 | Sears | A24F 40/46 131/328 |
| 2014/0246035 A1 * | 9/2014 | Minskoff | A24F 40/95 131/329 |
| 2014/0251324 A1 * | 9/2014 | Xiang | A24F 40/50 128/202.21 |
| 2014/0261486 A1 | 9/2014 | Potter et al. | |
| 2014/0261487 A1 * | 9/2014 | Chapman | A24F 40/44 131/328 |
| 2014/0305820 A1 * | 10/2014 | Xiang | A24F 40/95 206/236 |
| 2014/0334804 A1 * | 11/2014 | Choi | A24F 40/60 392/404 |
| 2014/0360512 A1 * | 12/2014 | Xiang | H02J 7/0077 131/328 |
| 2015/0027469 A1 | 1/2015 | Tucker et al. | |
| 2015/0047662 A1 * | 2/2015 | Hopps | A61M 15/06 131/329 |
| 2015/0053217 A1 * | 2/2015 | Steingraber | A24F 40/60 131/329 |
| 2015/0053219 A1 * | 2/2015 | Roudier | A24F 42/10 131/329 |
| 2015/0075546 A1 * | 3/2015 | Kueny, Sr. | A24F 40/51 131/329 |
| 2015/0101606 A1 * | 4/2015 | White | A61M 11/042 128/203.26 |
| 2015/0122252 A1 * | 5/2015 | Frija | A61M 15/06 128/202.21 |
| 2015/0173124 A1 * | 6/2015 | Qiu | G06F 13/387 131/328 |
| 2015/0209530 A1 | 7/2015 | White | |
| 2015/0224268 A1 * | 8/2015 | Henry | G06Q 30/00 128/202.21 |
| 2015/0237917 A1 * | 8/2015 | Lord | A24F 40/51 131/328 |
| 2015/0245661 A1 * | 9/2015 | Milin | A24F 40/40 131/329 |
| 2015/0257445 A1 * | 9/2015 | Henry, Jr | A24F 40/53 131/328 |
| 2015/0257448 A1 * | 9/2015 | Lord | G05B 23/0267 700/90 |
| 2015/0258289 A1 * | 9/2015 | Henry, Jr | A61M 15/06 128/202.21 |
| 2015/0288468 A1 * | 10/2015 | Xiang | H04B 7/26 455/500 |
| 2015/0357839 A1 * | 12/2015 | Cai | A24F 40/53 131/329 |
| 2015/0359263 A1 * | 12/2015 | Bellinger | A24F 40/51 392/394 |
| 2015/0369533 A1 * | 12/2015 | Sillince | F25D 3/107 62/77 |
| 2016/0007651 A1 * | 1/2016 | Ampolini | H04M 1/72412 131/328 |

(56) References Cited

U.S. PATENT DOCUMENTS

| | | | |
|---|---|---|---|
| 2016/0021930 A1* | 1/2016 | Minskoff | A61M 11/041 |
| | | | 131/329 |
| 2016/0073695 A1* | 3/2016 | Sears | A24F 40/30 |
| | | | 131/329 |
| 2016/0106156 A1* | 4/2016 | Qiu | H02J 7/0063 |
| | | | 392/404 |
| 2016/0120224 A1* | 5/2016 | Mishra | H05B 1/0297 |
| | | | 392/390 |
| 2016/0219938 A1* | 8/2016 | Mamoun | A24F 40/53 |
| 2016/0285983 A1* | 9/2016 | Liu | A24F 40/65 |
| 2016/0331024 A1* | 11/2016 | Cameron | A24F 40/50 |
| 2016/0331026 A1* | 11/2016 | Cameron | A24F 40/30 |
| 2016/0331027 A1* | 11/2016 | Cameron | A61M 15/02 |
| 2016/0331035 A1* | 11/2016 | Cameron | G08C 17/02 |
| 2016/0331859 A1* | 11/2016 | Cameron | A61L 9/02 |
| 2016/0337362 A1* | 11/2016 | Cameron | A61M 11/005 |
| 2016/0338407 A1* | 11/2016 | Kerdemelidis | A24F 40/30 |
| 2016/0345628 A1* | 12/2016 | Sabet | H04M 1/72409 |
| 2016/0360786 A1* | 12/2016 | Bellinger | A24F 40/53 |
| 2016/0363917 A1* | 12/2016 | Blackley | G06Q 30/0601 |
| 2016/0374401 A1* | 12/2016 | Liu | A24F 40/50 |
| | | | 131/328 |
| 2017/0042230 A1* | 2/2017 | Cameron | A24F 40/60 |
| 2017/0042231 A1* | 2/2017 | Cameron | A24F 40/65 |
| 2017/0045994 A1* | 2/2017 | Murison | A61M 11/042 |
| 2017/0046357 A1* | 2/2017 | Cameron | A24F 40/30 |
| 2017/0046738 A1* | 2/2017 | Cameron | G06Q 30/0255 |
| 2017/0055588 A1* | 3/2017 | Cameron | A61M 15/06 |
| 2017/0064999 A1* | 3/2017 | Perez | B65D 85/54 |
| 2017/0079327 A1* | 3/2017 | Wu | H02J 7/0042 |
| 2017/0079329 A1* | 3/2017 | Zitzke | H05B 1/0225 |
| 2017/0086496 A1* | 3/2017 | Cameron | A24F 40/00 |
| 2017/0086497 A1* | 3/2017 | Cameron | A24F 40/60 |
| 2017/0086503 A1* | 3/2017 | Cameron | A24F 40/90 |
| 2017/0086504 A1* | 3/2017 | Cameron | B03C 3/017 |
| 2017/0086505 A1* | 3/2017 | Cameron | A24F 40/50 |
| 2017/0086507 A1* | 3/2017 | Rado | H05B 1/0244 |
| 2017/0091490 A1* | 3/2017 | Cameron | G09G 3/2096 |
| 2017/0092106 A1* | 3/2017 | Cameron | A24F 40/65 |
| 2017/0093960 A1* | 3/2017 | Cameron | H04W 4/80 |
| 2017/0093981 A1* | 3/2017 | Cameron | A24F 40/65 |
| 2017/0119058 A1* | 5/2017 | Cameron | A24F 40/30 |
| 2017/0127727 A1* | 5/2017 | Davidson | A61K 31/352 |
| 2017/0135400 A1* | 5/2017 | Liu | G07C 9/00896 |
| 2017/0135407 A1* | 5/2017 | Cameron | G10L 17/00 |
| 2017/0135408 A1* | 5/2017 | Cameron | F22B 1/285 |
| 2017/0135409 A1* | 5/2017 | Cameron | H05B 1/0244 |
| 2017/0135410 A1* | 5/2017 | Cameron | H05B 3/12 |
| 2017/0135411 A1* | 5/2017 | Cameron | A24F 40/50 |
| 2017/0135412 A1* | 5/2017 | Cameron | A24F 40/51 |
| 2017/0136193 A1* | 5/2017 | Cameron | H05B 1/0227 |
| 2017/0136194 A1* | 5/2017 | Cameron | A24F 40/65 |
| 2017/0136301 A1* | 5/2017 | Cameron | A24F 40/00 |
| 2017/0143917 A1* | 5/2017 | Cohen | A24F 40/50 |
| 2017/0150756 A1* | 6/2017 | Rexroad | H05B 1/0244 |
| 2017/0157341 A1* | 6/2017 | Pandya | A61M 11/005 |
| 2017/0181467 A1* | 6/2017 | Cameron | A63F 13/90 |
| 2017/0181474 A1* | 6/2017 | Cameron | A24F 40/48 |
| 2017/0181475 A1* | 6/2017 | Cameron | A24F 40/30 |
| 2017/0185364 A1* | 6/2017 | Cameron | A24F 40/00 |
| 2017/0196270 A1* | 7/2017 | Vick | G06F 21/32 |
| 2017/0208867 A1* | 7/2017 | Li | A24F 40/65 |
| 2017/0215480 A1* | 8/2017 | Qiu | A24F 40/53 |
| 2017/0224020 A1* | 8/2017 | Fernando | H02J 7/0042 |
| 2017/0231280 A1* | 8/2017 | Anton | A24F 40/53 |
| | | | 392/404 |
| 2017/0245550 A1* | 8/2017 | Freelander | A61M 15/0051 |
| 2017/0245554 A1* | 8/2017 | Perez | B65D 85/54 |
| 2017/0258136 A1* | 9/2017 | Hawes | A24F 40/65 |
| 2017/0258142 A1* | 9/2017 | Hatton | H05B 1/0244 |
| 2017/0259170 A1* | 9/2017 | Bowen | A24F 40/50 |
| 2017/0273357 A1* | 9/2017 | Barbuck | H02J 7/00 |
| 2017/0280779 A1* | 10/2017 | Qiu | G05D 23/1917 |
| 2017/0290998 A1* | 10/2017 | Poston | A61M 11/007 |
| 2017/0295844 A1* | 10/2017 | Thevenaz | A24F 40/46 |
| 2017/0303590 A1* | 10/2017 | Cameron | G01P 5/02 |
| 2017/0303593 A1* | 10/2017 | Cameron | A24F 40/53 |
| 2017/0303594 A1* | 10/2017 | Cameron | A61K 9/0073 |
| 2017/0309091 A1* | 10/2017 | Cameron | G07C 5/0825 |
| 2017/0325289 A1* | 11/2017 | Liu | H05B 1/0227 |
| 2017/0332702 A1* | 11/2017 | Cameron | A24B 15/167 |
| 2017/0333415 A1* | 11/2017 | Williams | A24B 15/167 |

FOREIGN PATENT DOCUMENTS

| | | |
|---|---|---|
| CN | 101778578 B | 8/2011 |
| CN | 104284606 A | 1/2015 |
| CN | 204273243 U | 4/2015 |
| CN | 105163611 A | 12/2015 |
| EP | 0336458 A2 | 10/1989 |
| JP | 2008-518614 A | 6/2008 |
| JP | 2015-513393 A | 5/2015 |
| JP | 2016-510994 A | 4/2016 |
| RU | 2120781 C1 | 10/1998 |
| WO | WO-2006/082529 A2 | 8/2006 |
| WO | WO-2014116974 A1 | 7/2014 |
| WO | WO-2015/009863 A1 | 1/2015 |
| WO | WO-2015/013135 A1 | 1/2015 |
| WO | WO-2015117243 A1 | 8/2015 |

OTHER PUBLICATIONS

Ranjani Siriwardane et al., "Adsorption and Desorption of CO2 on Solid Sorbents," U.S. Department of Energy, National Energy Technology Laboratory.

"An Introduction to Zeolite Molecular Sieves," UOP.

Ranjani Siriwardane et al., "Adsorption of CO2 on Molecular Sieves and Activated Carbon," U.S. Department of Energy, National Energy Technology Lab, Feb. 7, 2001, American Chemical Society, Energy & Fuels, 15, 279-284.

Cheng-Hsiu Yu et al., "A Review of CO2 Capture by Absorption and Adsorption," Department of Chemical Engineering, 2012, Aerosal and Air Quality Research, 12, 745-769.

Jian-Rong Li et al., "Carbon dioxide capture-related gas adsorption and separation in metal-organic frameworks," Coordination Chemistry Reviews, 2011, 255, 1791-1823.

Zhijuan Zhang et al., "Adsorption of CO2 on Zeolite 13X and Activated Carbon with Higher Surface Area." Separation Science and Technology, Mar. 2010, 45:5, 710-719.

International Search Report and Written Opinion for PCT/EP2017/067160 dated Sep. 14, 2017.

Office Action dated Jul. 28, 2021 issued in corresponding Japanese Patent Application No. 2018-566451.

European Office Action dated Apr. 15, 2020 for corresponding European Application No. 17736957.6.

Office Action dated Mar. 16, 2021 in Chinese Application No. 201780037051.3.

International Preliminary Report on Patentability dated Jan. 17, 2019 for corresponding International Application No. PCT/EP2017/067160.

Chinese Office Action dated Oct. 27, 2021 for corresponding Chinese Application No. 201780037051.3, and English-language translation thereof.

Israeli Office Action dated Sep. 14, 2021 for corresponding Israeli Application No. 263293, and English-language translation thereof.

Japanese Notice of Allowance dated Dec. 8, 2021 for corresponding Japanese Application No. 2018-566451, and English-language translation thereof.

* cited by examiner

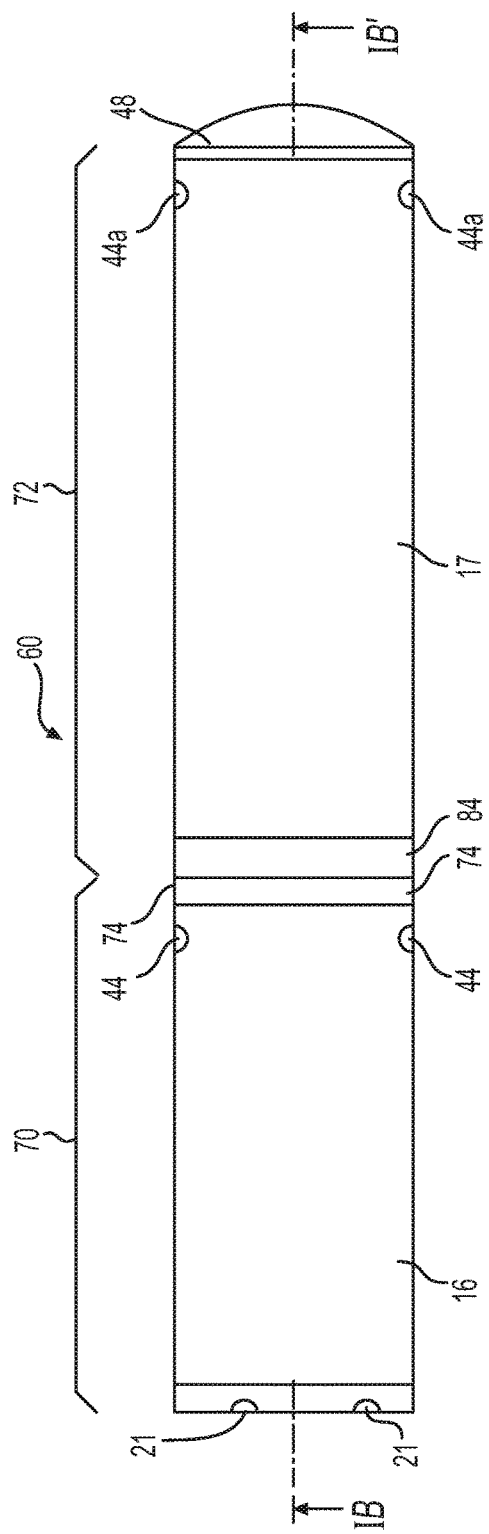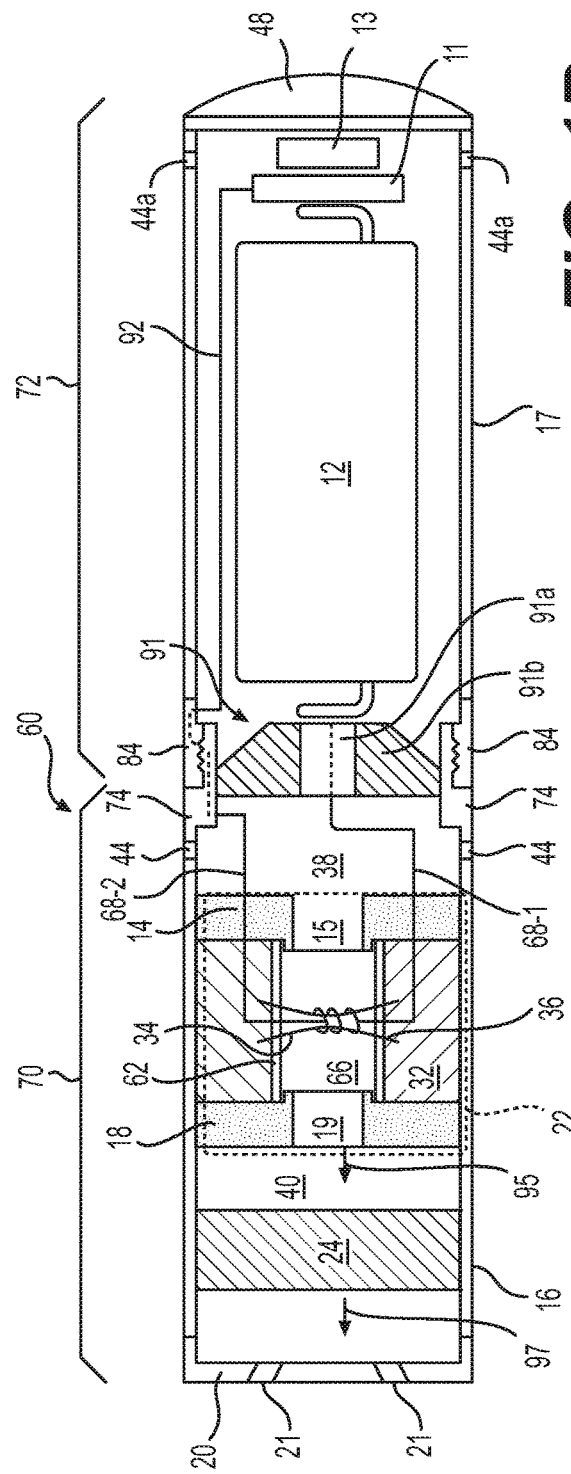

ADDITIVE ASSEMBLY FOR ELECTRONIC VAPING DEVICE

CROSS-REFERENCE TO RELATED APPLICATIONS

This application is a continuation under 35 U.S.C. § 120 of U.S. application Ser. No. 15/204,361, filed Jul. 7, 2016, the entire contents of each of which is incorporated herein by reference.

BACKGROUND

Field

The present disclosure relates to electronic vaping and/or e-vaping devices.

Description of Related Art

E-vaping devices, also referred to herein as electronic vaping devices (EVDs) may be used by adult vapers for portable vaping. Flavored vapors within an e-vaping device may be used to deliver a flavor along with the vapor that may be produced by the e-vaping device. The flavored vapors may be delivered via a flavor system.

In some cases, a loss of flavoring in a flavored vapor from a flavor system may occur when the flavor system is exposed to a heat source. In some cases, a loss of flavoring in a flavored vapor may occur as a result of chemical reactions between the flavor system elements or thermal degradation at a sufficiently high temperature.

Such a loss of flavoring from a flavoring system may reduce a sensory experience provided by an e-vaping device in which the flavoring system is included.

SUMMARY

According to some example embodiments, a cartridge for an electronic vaping device (EVD) may include a vaporizer assembly configured to form a generated vapor; and an additive assembly in fluid communication with the vaporizer assembly. The additive assembly may include: an adsorbent material including adsorbed carbon dioxide, the adsorbent material configured to release the carbon dioxide into the generated vapor based on at least a portion of the generated vapor adsorbing on the adsorbent material, the adsorbent material further configured to generate heat based on the portion of the generated vapor adsorbing on the adsorbent material, and a flavor material including a flavorant, the flavor material configured to release the flavorant into the generated vapor based at least in part on absorbing the heat generated by the adsorbent material.

The adsorbent material may include a plurality of adsorbent beads.

The flavor material may include a plurality of beads, and each of the beads may include the flavorant.

The flavor material may include at least one botanical substance, and the at least one botanical substance may include the flavorant.

The adsorbent material may include at least one of zeolite, silica, activated carbon, and molecular sieves.

The cartridge may further include a vaporizer assembly module and at least one additive module. The vaporizer assembly module may be removably coupled to the at least one additive module. The vaporizer assembly module may include the vaporizer assembly, the at least one additive module including the additive assembly.

The cartridge may further include a plurality of additive modules removably coupled together, each of the additive modules including a separate one of the adsorbent material and the flavor material.

The additive assembly may include at least first and second additive structures. The first and second additive structures may include at least one of the adsorbent material and the flavor material. The first and second additive structures may at least partially define a boundary of at least one flow pathway between the first and second additive structures.

According to some example embodiments, an e-vaping device may include a vaporizer assembly configured to form a generated vapor and an additive assembly in fluid communication with the vaporizer assembly. The additive assembly may include an adsorbent material including adsorbed carbon dioxide, the adsorbent material configured to release the carbon dioxide into the generated vapor based on at least a portion of the generated vapor adsorbing on the adsorbent material, the adsorbent material further configured to generate heat based on the portion of the generated vapor adsorbing on the adsorbent material. The additive assembly may include a flavor material including a flavorant, the flavor material configured to release the flavorant into the generated vapor based at least in part on absorbing the heat generated by the adsorbent material. The e-vaping device may include a power supply section configured to selectively supply power to the vaporizer assembly.

The adsorbent material may include a plurality of adsorbent beads.

The flavor material may include a plurality of beads, and each of the beads includes the flavorant.

The flavor material may include at least one botanical substance, and the at least one botanical substance may include the flavorant.

The adsorbent beads may include at least one of zeolite, silica, activated carbon, and molecular sieves.

The e-vaping device may further include a vaporizer assembly module and at least one additive module. The vaporizer assembly module may be removably coupled to the at least one additive module. The vaporizer assembly module may include the vaporizer assembly, the at least one additive module including the additive assembly.

The e-vaping device may further include a plurality of additive modules removably coupled together, each of the additive modules including a separate one of the adsorbent material and the flavor material.

The additive assembly may include at least first and second additive structures. The first and second additive structures may include at least one of the adsorbent material and the flavor material. The first and second additive structures may at least partially define a boundary of at least one flow pathway between the first and second additive structures.

The power supply section may include a rechargeable battery.

According to some example embodiments, a cartridge for an electronic vaping device (EVD) may include: a vaporizer assembly configured to form a generated vapor; and an additive assembly in fluid communication with the vaporizer assembly. The additive assembly may include an adsorbent material including adsorbed carbon dioxide, the adsorbent material configured to release the carbon dioxide into the generated vapor based on at least a portion of the generated vapor adsorbing on the adsorbent material, the adsorbent material further configured to generate heat based on at least a portion of the generated vapor adsorbing on the adsorbent material.

The adsorbent material may include a plurality of adsorbent beads.

The adsorbent material may include at least one of zeolite, silica, activated carbon, and molecular sieves.

The adsorbent material may be configured to generate heat based on at least a portion of the generated vapor adsorbing on the adsorbent material. The additive assembly may include a flavor material, the flavor material including a flavorant, the flavor material configured to release the flavorant into the generated vapor based at least in part on absorbing the heat generated by the adsorbent material.

The flavor material may include a plurality of beads, and each of the beads includes the at least one flavorant.

The flavor material may include at least one botanical substance, and the at least one botanical substance may include the at least one flavorant.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A is a side view of an e-vaping device according to some example embodiments.

FIG. 1B is a cross-sectional view along line IB-IB' of the e-vaping device of FIG. 1A.

DETAILED DESCRIPTION OF EXAMPLE EMBODIMENTS

Figure 2A:
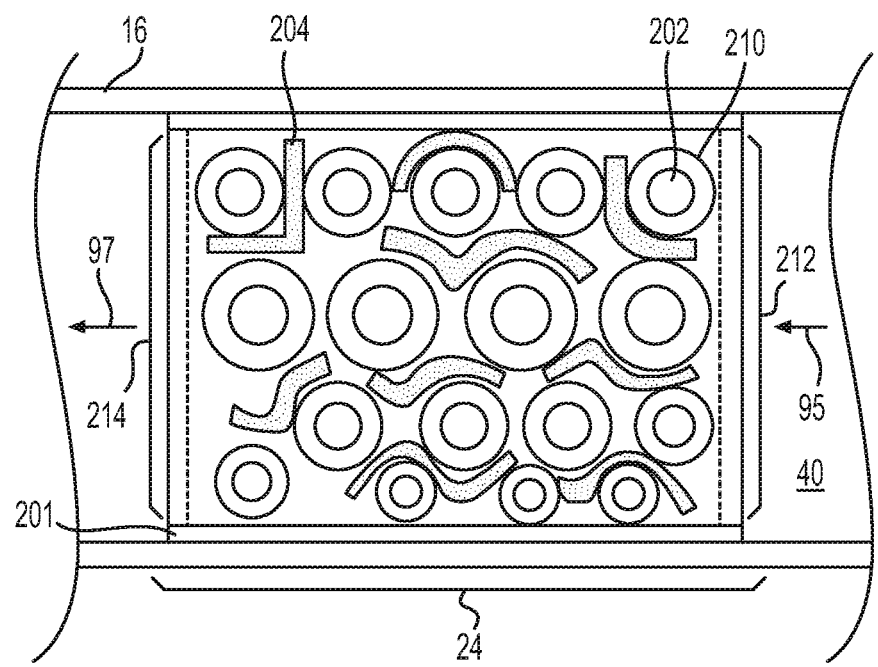
FIG. 2A is a plan view of an additive assembly according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, elements, regions, layers and/or sections, these elements, elements, regions, layers, and/or sections should not be limited by these terms. These terms are only used to distinguish one element, element, region, layer, or section from another region, layer, or section. Thus, a first element, element, region, layer, or section discussed below could be termed a second element, element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or elements, but do not preclude the presence or addition of one or more other features, integers, steps, operations, elements, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a side view of an e-vaping device 60 according to some example embodiments. FIG. 1B is a cross-sectional view along line IB-IB' of the e-vaping device of FIG. 1A. The e-vaping device 60 may include one or more of the features set forth in U.S. Patent Application Publication No. 2013/0192623 to Tucker et al. filed Jan. 31, 2013 and U.S. Patent Application Publication No. 2013/0192619 to Tucker et al. filed Jan. 14, 2013, the entire contents of each of which are incorporated herein by reference thereto. As used herein, the term "e-vaping device" is inclusive of all types of electronic vaping devices, regardless of form, size or shape.

Referring to FIG. 1A and FIG. 1B, an e-vaping device 60 includes a replaceable cartridge (or first section) 70 and a reusable power supply section (or second section) 72. The sections 70, 72 may be coupled together at complimentary interfaces 74, 84 of the respective sections 70, 72.

In some example embodiments, the interfaces 74, 84 are threaded connectors. It should be appreciated that an interface 74, 84 may be any type of connector, including, without limitation, a snug-fit, detent, clamp, bayonet, and/or clasp.

As shown in FIG. 1A and FIG. 1B, in some example embodiments, an outlet end insert 20 may be positioned at an outlet end of the cartridge 70. The outlet end insert 20 includes at least one outlet port 21 that may be located off-axis from the longitudinal axis of the e-vaping device 60. One or more of the outlet ports 21 may be angled outwardly in relation to the longitudinal axis of the e-vaping device 60. Multiple outlet ports 21 may be uniformly or substantially uniformly distributed about the perimeter of the outlet end insert 20 so as to substantially uniformly distribute vapor drawn through the outlet end insert 20 during vaping. Thus, as a vapor is drawn through the outlet end insert 20, the vapor may move in different directions.

The cartridge 70 includes a vaporizer assembly 22 and an additive assembly 24. The vaporizer assembly 22 may form a generated vapor 95, and the additive assembly 24 may form a flavored vapor 97 based on releasing one or more additives into the generated vapor 95 formed by the vaporizer assembly 22.

In some example embodiments, the additive assembly 24 is configured to release one or more additives into the generated vapor 95 based on desorbing one or more additives from one or more adsorbent materials included in the additive assembly 24.

In some example embodiments, the additive assembly 24 is configured to release one or more additives into the generated vapor 95 based on desorption of the one or more additives from the one or more adsorbent materials. The one or more additives may be desorbed from the one or more additive materials based on one or more elements of the generated vapor 95 adsorbing on the one or more adsorbent materials, thereby displacing the one or more additives on the one or more adsorbent materials. In some example embodiments, the additive assembly 24 reacts with one or more elements of the generated vapor 95 to release the one or more additives.

As described further below, the one or more elements of the generated vapor 95 may include one or more elements of a pre-vapor formulation from which the generated vapor 95 is formed. The one or more elements may include at least one of water, solvents, active ingredients, ethanol, plant extracts, and natural or artificial flavors. A pre-vapor formulation may include at least one of glycerin and propylene glycol.

Still referring to FIG. 1A and FIG. 1B, the cartridge 70 includes an outer housing 16 extending in a longitudinal direction and an inner tube 62 coaxially positioned within the outer housing 16. The power supply section 72 includes an outer housing 17 extending in a longitudinal direction. In some example embodiments, the outer housing 16 may be a single tube housing both the cartridge 70 and the power supply section 72 and the entire e-vaping device 60 may be disposable. The outer housing 16 may have a generally cylindrical cross-section. In some example embodiments, the outer housing 16 may have a generally triangular cross-section along one or more of the cartridge 70 and the power supply section 72. In some example embodiments, the outer housing 16 may have a greater circumference or dimensions at a tip end than at an outlet end of the e-vaping device 60.

The vaporizer assembly 22 includes inner tube 62, gasket 14, gasket 18, a reservoir 32 configured to hold a pre-vapor formulation, a dispensing interface 34 configured to draw pre-vapor formulation from the reservoir 32, and a heating element 36 configured to vaporize the drawn pre-vapor formulation.

At one end of the inner tube 62, a nose portion of gasket (or seal) 14 is fitted into an end portion of the inner tube 62. An outer perimeter of the gasket 14 may provide a substantially airtight seal with an interior surface of the outer housing 16. The gasket 14 includes a passage 15 that opens into an interior of the inner tube 62 that defines a channel 66. A space 38 at a backside portion of the gasket 14 assures communication between the passage 15 and one or more air inlet ports 44 located between the gasket 14 and a connector element 91. The connector element 91 may be included in the interface 74.

In some example embodiments, a nose portion of gasket 18 is fitted into another end portion of the inner tube 62. An outer perimeter of the gasket 18 may provide a substantially airtight seal with an interior surface of the outer housing 16. The gasket 18 includes a passage 19 disposed between the channel 66 of the inner tube 62 and the interior of an outlet end insert 20. The passage 19 may transport a vapor from the channel 66 to the outlet end insert 20 via the additive assembly 24.

In some example embodiments, at least one air inlet port 44 may be formed in the outer housing 16, adjacent to the interface 74 to minimize the probability of an adult vaper's fingers occluding one of the ports and to control the resistance-to-draw (RTD) during vaping. In some example embodiments, the air inlet ports 44 may be machined into the outer housing 16 with precision tooling such that their diameters are closely controlled and replicated from one e-vaping device 60 to the next during manufacture.

In some example embodiments, the air inlet ports 44 may be drilled with carbide drill bits or other high-precision tools and/or techniques. In some example embodiments, the outer housing 16 may be formed of metal or metal alloys such that the size and shape of the air inlet ports 44 may not be altered during manufacturing operations, packaging, and vaping. Thus, the air inlet ports 44 may provide consistent RTD. In some example embodiments, the air inlet ports 44 may be sized and configured such that the e-vaping device 60 has a RTD in the range of from about 60 mm $H_2O$ to about 150 mm $H_2O$.

Still referring to FIG. 1A and FIG. 1B, the reservoir 32 may include a pre-vapor formulation. The space defined between the gaskets 14 and 18, the outer housing 16 and the inner tube 62 may establish the confines of the reservoir 32, such that the reservoir 32 may be contained in an outer annulus between the inner tube 62, the outer housing 16 and the gaskets 14 and 18. Thus, the reservoir 32 may at least partially surround the channel 66.

The dispensing interface 34 is coupled to the reservoir 32, such that the dispensing interface 34 may extend transversely across the channel 66 between opposing portions of the reservoir 32. The dispensing interface 34 is configured to draw pre-vapor formulation from the reservoir 32.

The heating element 36 is coupled to the dispensing interface 34 and is configured to generate heat. As shown in the example embodiment illustrated in FIG. 1B, the heating element 36 may extend transversely across the channel 66 between opposing portions of the reservoir 32. In some example embodiments, the heating element 36 may extend parallel to a longitudinal axis of the channel 66.

The dispensing interface 34 is configured to draw pre-vapor formulation from the reservoir 32, such that the pre-vapor formulation may be vaporized from the dispensing interface 34 based on heating of the dispensing interface 34 by the heating element 36.

During vaping, pre-vapor formulation may be transferred from the reservoir 32 and/or storage medium in the proximity of the heating element 36 via capillary action of a dispensing interface 34. The dispensing interface 34 may include a first end portion and a second end portion. The first and second end portions of the dispensing interface 34 may extend into opposite sides of the reservoir 32. Dispensing interface 34 end portions may be referred to herein as roots. The heating element 36 may at least partially surround a central portion of the dispensing interface 34 such that if and/or when the heating element 36 is activated to generate heat, the pre-vapor formulation in the central portion of the dispensing interface 34 may be vaporized by the heating element 36 to form a vapor. The central portion of a dispensing interface 34 may be referred to herein as a trunk.

The reservoir 32 may include a pre-vapor formulation which is free of flavorants, such that if and/or when the vaporizer assembly 22 forms a vapor 95, via vaporization of a pre-vapor formulation by the heating element 36, the vapor 95 may be substantially absent of flavor, thereby being a "generated vapor." Such an absence of flavorants in the reservoir 32 of the vaporizer assembly 22 may result in mitigation of chemical reactions between pre-vapor formulation materials and the flavorants in the reservoir 32 and upon vaporization as a result of heating of the pre-vapor formulation by the heating element 36.

Still referring to FIG. 1A and FIG. 1B, the additive assembly 24 is positioned between the vaporizer assembly 22 and the outlet end insert 20. As shown in FIG. 1B, the additive assembly 24 may be spaced apart from the vaporizer assembly 22 such that at least the additive assembly 24, vaporizer assembly 22, and outer housing 16 define a space 40 between the additive assembly 24 and the vaporizer assembly 22. A generated vapor 95 formed by the vaporizer assembly 22 may pass through space 40 such that generated vapor 95 is in fluid communication with the additive assembly 24. In some example embodiments, the additive assembly 24 is located within the space 40 such that a generated vapor 95 may pass around at least one outer surface of the additive assembly 24 through the space 40.

The additive assembly 24 is configured to form a flavored vapor 97 based on releasing one or more additives into a generated vapor 95 passing in fluid communication with one or more portions of the additive assembly 24.

The additive assembly 24 is positioned in fluid communication with both the vaporizer assembly 22 and the outlet end insert 20. The cartridge 70 may be configured to direct generated vapor 95 formed by the vaporizer assembly 22 to exit the cartridge 70 via the outlet ports 21. The cartridge 70 may further be configured to direct the generated vapor 95 to pass in fluid communication with the additive assembly 24 towards the outlet ports 21. Passing in fluid communication with the additive assembly 24 may include passing through at least a portion of the additive assembly 24.

The additive assembly 24 may hold an additive and may be configured to release the additive into a generated vapor 95 formed by the vaporizer assembly 22 to form a flavored vapor 97. As described further below, in some example embodiments the additive is carbon dioxide, and the additive assembly 24 may include one or more adsorbent materials onto which carbon dioxide is adsorbed. The additive assembly 24 may be configured to release an additive that is carbon dioxide into the generated vapor 95 to form a flavored vapor 97. The additive assembly 24 may release the carbon dioxide into the generated vapor 95 based on one or more elements of the generated vapor 95 adsorbing onto the adsorbent material.

The additive assembly 24, as discussed further below, may include a porous structure. The porous structure may hold an additive in fluid communication with at least one of the vaporizer assembly 22 and the space 40, so that generated vapor 95 may pass at least partially through the porous structure and in fluid communication with the additive held in the porous structure. The generated vapor 95 may act as an eluent, eluting the additive from the porous structure and into the generated vapor 95 to form an eluate. The eluate may include the generated vapor 95 and the additive. Such an eluate may be referred to as the flavored vapor 97.

In some example embodiments, an additive eluted into the generated vapor 95 is in a particulate phase. A particulate phase may include a liquid phase, solid phase, or the like. In some example embodiments, an additive eluted into the generated vapor 95 is in a vapor phase, gas phase, etc. An additive may include a volatile flavor substance, and the volatile flavor substance may be eluted into the generated vapor 95. In some example embodiments, an additive eluted into the generated vapor 95 includes a nonvolatile flavor substance.

In some example embodiments, if and/or when the additive assembly 24 holds the additive separate from the vaporizer assembly 22 and the cartridge 70 is configured to direct generated vapor 95 through the additive assembly 24 subsequent to formation of the generated vapor 95, the generated vapor 95 may be cooled from an initial temperature at formation in the vaporizer assembly 22. Where the generated vapor 95 passing through the additive assembly 24 is cooled from the initial temperature, chemical reactions between the additive eluted into the generated vapor 95 and the elements of the generated vapor 95 may be at least partially mitigated.

In some example embodiments, if and/or when the e-vaping device 60 includes an additive assembly 24 that holds an additive separate from the vaporizer assembly 22, the e-vaping device 60 may be configured to mitigate a probability of chemical reactions between the additive and one or more elements of the vaporizer assembly 22. An absence of such chemical reactions may result in an absence of reaction products in the flavored vapor 97. Such reaction products may detract from a sensory experience provided by the flavored vapor 97. As a result, an e-vaping device 60 that is configured to mitigate the probability of such chemical reactions may provide a more consistent and improved sensory experience through the flavored vapor 97.

In some example embodiments, the additive included in an e-vaping device 60 may be replaceable independently of the pre-vapor formulation in the cartridge 70, as the flavorants are included in an additive assembly 24 that is separate from the vaporizer assembly 22 in which the pre-vapor formulation is included. The additive assembly 24 may be replaced with another additive assembly 24 to swap the additive included in the e-vaping device 60 as desired by an adult vaper. The additive assembly 24 may be replaced with another additive assembly 24 to replenish additives in the e-vaping device 60 without replacing a vaporizer assembly 22, where the vaporizer assembly 22 may include sufficient pre-vapor formulation to support additional vaping.

In some example embodiments, one or more of the interfaces 74, 84 include one or more of a cathode connector element and an anode connector element. In the example embodiment illustrated in FIG. 1B, for example, electrical lead 68-2 is coupled to the interface 74. As further shown in FIG. 1B, the power supply section 72 includes a lead 92 that couples the control circuitry 11 to the interface 84. If and/or when interfaces 74, 84 are coupled together, the coupled interfaces 74, 84 may electrically couple leads 68-2 and 92 together.

In some example embodiments, the cartridge 70 includes a connector element 91. Connector element 91 may include one or more of a cathode connector element and an anode connector element. In the example embodiment illustrated in FIG. 1B, for example, electrical lead 68-1 is coupled to the connector element 91. As further shown in FIG. 1B, the connector element 91 is configured to couple with a power supply 12 included in the power supply section 72. If and/or when interfaces 74, 84 are coupled together, the connector element 91 and power supply 12 may be coupled together. Coupling connector element 91 and power supply 12 together may electrically couple lead 68-1 and power supply 12 together.

The connector element 91 may include an insulating material 91*b* and a conductive material 91*a*. The conductive material 91*a* may electrically couple lead 68-1 to power supply 12, and the insulating material 91*b* may insulate the conductive material 91*a* from the interface 74, such that a probability of an electrical short between the lead 68-1 and the interface 74 is reduced and/or prevented. For example, if and/or when the connector element 91 includes a cylindrical cross-section orthogonal to a longitudinal axis of the e-vaping device 60, the insulating material 91*b* included in connector element 91 may be in an outer annular portion of the connector element 91 and the conductive material 91*a* may be in an inner cylindrical portion of the connector element 91, such that the insulating material 91*b* surrounds the conductive material 91*a* and reduces and/or prevents a probability of an electrical connection between the conductive material 91*a* and the interface 74.

Still referring to FIG. 1A and FIG. 1B, the power supply section 72 includes a sensor 13 responsive to air drawn into the power supply section 72 via an air inlet port 44*a* adjacent to a free end or tip end of the e-vaping device 60, at least one power supply 12, and control circuitry 11. The power supply 12 may include a rechargeable battery. The sensor 13 may be one or more of a pressure sensor, a microelectromechanical system (MEMS) sensor, etc.

In some example embodiments, the power supply 12 includes a battery arranged in the e-vaping device 60 such that the anode is downstream of the cathode. A connector element 91 contacts the downstream end of the battery. The heating element 36 is connected to the power supply 12 by at least lead 68-1 and connector element 91 if and/or when interfaces 74, 84 are coupled together.

The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The e-vaping device 60 may be usable by an adult vaper until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the e-vaping device 60, a Universal Serial Bus (USB) charger or other suitable charger assembly may be used.

Upon completing the connection between the cartridge 70 and the power supply section 72, the at least one power supply 12 may be electrically connected with the heating element 36 of the cartridge 70 upon actuation of the sensor 13. Air is drawn primarily into the cartridge 70 through one or more air inlet ports 44. The one or more air inlet ports 44 may be located along the outer housing 16, 17 of the first and second sections 70, 72 or at one or more of the coupled interfaces 74, 84.

The sensor 13 may be configured to sense an air pressure drop and initiate application of voltage from the power supply 12 to the heating element 36. As shown in the example embodiment illustrated in FIG. 1B, some example embodiments of the power supply section 72 include a heater activation light 48 configured to glow if and/or when the heating element 36 is activated. The heater activation light 48 may include a light emitting diode (LED). Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. As shown in FIG. 1A and FIG. 1B, the heater activation light 48 may be located on the tip end of the e-vaping device 60. In some example embodiments, the heater activation light 48 may be located on a side portion of the outer housing 17.

In addition, the at least one air inlet port 44*a* may be located adjacent to the sensor 13, such that the sensor 13 may sense air flow indicative of vapor being drawn through the outlet end of the e-vaping device. The sensor 13 may activate the power supply 12 and the heater activation light 48 to indicate that the heating element 36 is activated.

Further, the control circuitry 11 may control the supply of electrical power to the heating element 36 responsive to the sensor 13. In some example embodiments, the control circuitry 11 may include a maximum, time-period limiter. In some example embodiments, the control circuitry 11 may include a manually operable switch for an adult vaper to manually initiate vaping. The time-period of the electric current supply to the heating element 36 may be pre-set depending on the amount of pre-vapor formulation desired to be vaporized. In some example embodiments, the control circuitry 11 may control the supply of electrical power to the heating element 36 as long as the sensor 13 detects a pressure drop.

To control the supply of electrical power to a heating element 36, the control circuitry 11 may execute one or more instances of computer-executable program code. The control circuitry 11 may include a processor and a memory. The memory may be a computer-readable storage medium storing computer-executable code.

The control circuitry 11 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 11 may be at least one of an application-specific integrated circuit (ASIC) and an ASIC chip.

The control circuitry 11 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

The control circuitry 11 may include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a USB flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The control circuitry 11 may be a special purpose machine configured to execute the computer-executable code to control the supply of electrical power to the heating element 36. Controlling the supply of electrical power to the heating element 36 may be referred to herein interchangeably as activating the heating element 36.

Still referring to FIG. 1A and FIG. 1B, if and/or when the heating element 36 is activated, the activated heating element 36 may heat a portion of a dispensing interface 34 surrounded by the heating element 36 for less than about 10 seconds. Thus, the power cycle (or maximum vaping length) may range in period from about 2 seconds to about 10 seconds (e.g., about 3 seconds to about 9 seconds, about 4 seconds to about 8 seconds or about 5 seconds to about 7 seconds).

The pre-vapor formulation is a material or combination of materials that may be transformed into a vapor. For example, the pre-vapor formulation may be a liquid, solid and/or gel formulation including, but not limited to, water, solvents, active ingredients, ethanol, plant extracts, natural or artificial flavors, and/or vapor formers such as glycerin and propylene glycol.

In some example embodiments, the pre-vapor formulation is one or more of propylene glycol, glycerin and combinations thereof.

The pre-vapor formulation may include nicotine or may exclude nicotine. The pre-vapor formulation may include one or more tobacco flavors. The pre-vapor formulation may include one or more flavors which are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

In some example embodiments, a generated vapor 95 formed at the vaporizer assembly 22 may be substantially free of one or more materials being in a gas phase. For example, the generated vapor 95 may include one or more materials substantially in a particulate phase and substantially not in a gas phase.

The storage medium of the reservoir 32 may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. In some example embodiments, the reservoir 32 may include a filled tank lacking any storage medium and containing only pre-vapor formulation.

The reservoir 32 may be sized and configured to hold enough pre-vapor formulation such that the e-vaping device 60 may be configured for vaping for at least about 200 seconds. The e-vaping device 60 may be configured to allow each vaping to last a maximum of about 5 seconds.

The dispensing interface 34 may include a wick. The dispensing interface 34 may include filaments (or threads) having a capacity to draw the pre-vapor formulation. For example, a dispensing interface 34 may be a wick that is be a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal direction of the e-vaping device 60. In some example embodiments, the dispensing interface 34 may include one to eight filament strands, each strand comprising a plurality of glass filaments twisted together. The end portions of the dispensing interface 34 may be flexible and foldable into the confines of the reservoir 32. The filaments may have a cross-section that is generally cross-shaped, clover-shaped, Y-shaped, or in any other suitable shape.

The dispensing interface 34 may include any suitable material or combination of materials, also referred to herein as wicking materials. Examples of suitable materials may be, but not limited to, glass, ceramic- or graphite-based materials. The dispensing interface 34 may have any suitable capillary drawing action to accommodate pre-vapor formulations having different physical properties such as density, viscosity, surface tension and vapor pressure.

In some example embodiments, the heating element 36 may include a wire coil which at least partially surrounds the dispensing interface 34 in the vaporizer assembly 22. The wire may be a metal wire and/or the wire coil may extend fully or partially along the length of the dispensing interface. The wire coil may further extend fully or partially around the circumference of the dispensing interface 34. In some example embodiments, the wire coil may be isolated from direct contact with the dispensing interface 34.

The heating element 36 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 36 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 36 may include at least one material selected from the group consisting of stainless steel, copper, copper alloys, nickel-chromium alloys, super alloys and combinations thereof. In some example embodiments, the heating element 36 may be formed of nickel-chromium alloys or iron-chromium alloys. In some example embodiments, the heating element 36 may be a ceramic heater having an electrically resistive layer on an outside surface thereof.

The heating element 36 may heat a pre-vapor formulation in the dispensing interface 34 by thermal conduction. Alternatively, heat from the heating element 36 may be conducted to the pre-vapor formulation by means of a heat conductive element or the heating element 36 may transfer heat to the incoming ambient air that is drawn through the e-vaping device 60 during vaping, which in turn heats the pre-vapor formulation by convection.

It should be appreciated that, instead of using a dispensing interface 34, the vaporizer assembly 22 may include a heating element 36 that is a porous material which incorporates a resistance heater formed of a material having a high electrical resistance capable of generating heat quickly.

In some example embodiments, the cartridge 70 may be replaceable. In other words, once one of the flavorant or the pre-vapor formulation of the cartridge is depleted, only the cartridge 70 may be replaced. In some example embodiments, the entire e-vaping device 60 may be disposed once one of the reservoir 32 or the additive assembly 24 is depleted.

In some example embodiments, the e-vaping device 60 may be about 80 mm to about 110 mm long and about 7 mm to about 8 mm in diameter. For example, in some example embodiments, the e-vaping device 60 may be about 84 mm long and may have a diameter of about 7.8 mm.

As used herein, the term "additive" is used to describe a compound or combination of compounds that may provide a sensory experience to an adult vaper if and/or when the additive is included in a generated vapor. An additive may include a flavorant. In some example embodiments, an additive may include carbon dioxide.

As used herein, the term "flavorant" is used to describe a compound or combination of compounds that may provide flavor and/or aroma to an adult vaper. In some example embodiments, a flavorant is configured to interact with sensory receptors that may be activated through orthonasal or retronasal paths of activation. A flavorant may include one or more volatile flavor substances.

The at least one flavorant may include one or more of a natural flavorant or an artificial ("synthetic") flavorant. The at least one flavorant may include one or more plant extracts. In some example embodiments, the at least one flavorant is one or more of tobacco flavor, menthol, wintergreen, peppermint, herb flavors, fruit flavors, nut flavors, liquor flavors, and combinations thereof. In some example embodiments, the flavorant is included in a botanical material. A botanical material may include material of one or more plants. A botanical material may include one or more herbs, spices, fruits, roots, leaves, grasses, or the like. For example, a botanical material may include orange rind material and sweetgrass material. In another example, a botanical material may include tobacco material.

In some example embodiments, the tobacco material may include material from any member of the genus *Nicotiana*. In some example embodiments, the tobacco material includes a blend of two or more different tobacco varieties. Examples of suitable types of tobacco materials that may be used include, but are not limited to, flue-cured tobacco, Burley tobacco, Maryland tobacco, Oriental tobacco, Dark Tobacco, rare tobacco, specialty tobacco, blends thereof and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass.

Figure 2B:
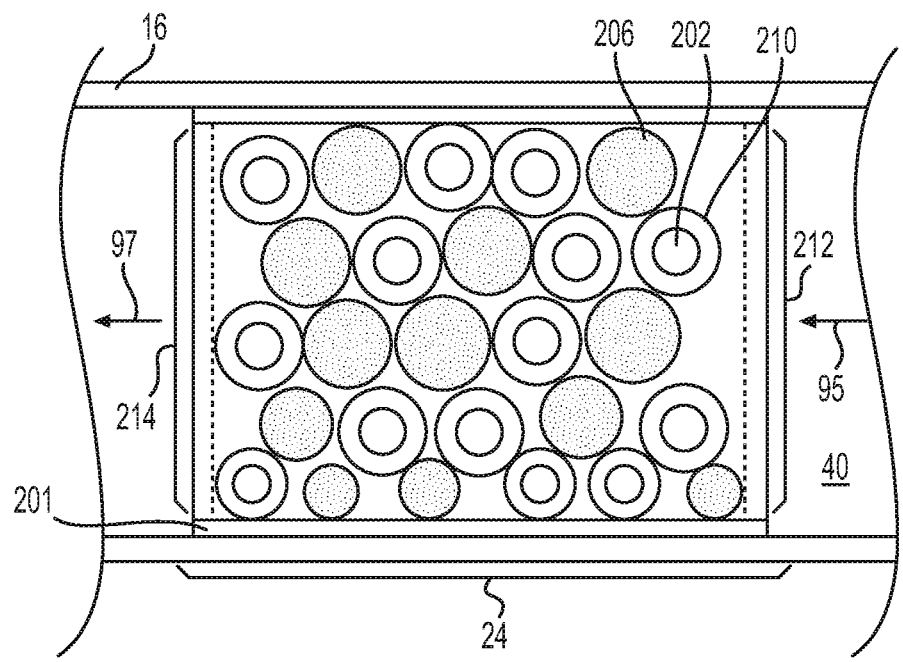
FIG. 2B is a plan view of an additive assembly according to some example embodiments.
Figure 2C:
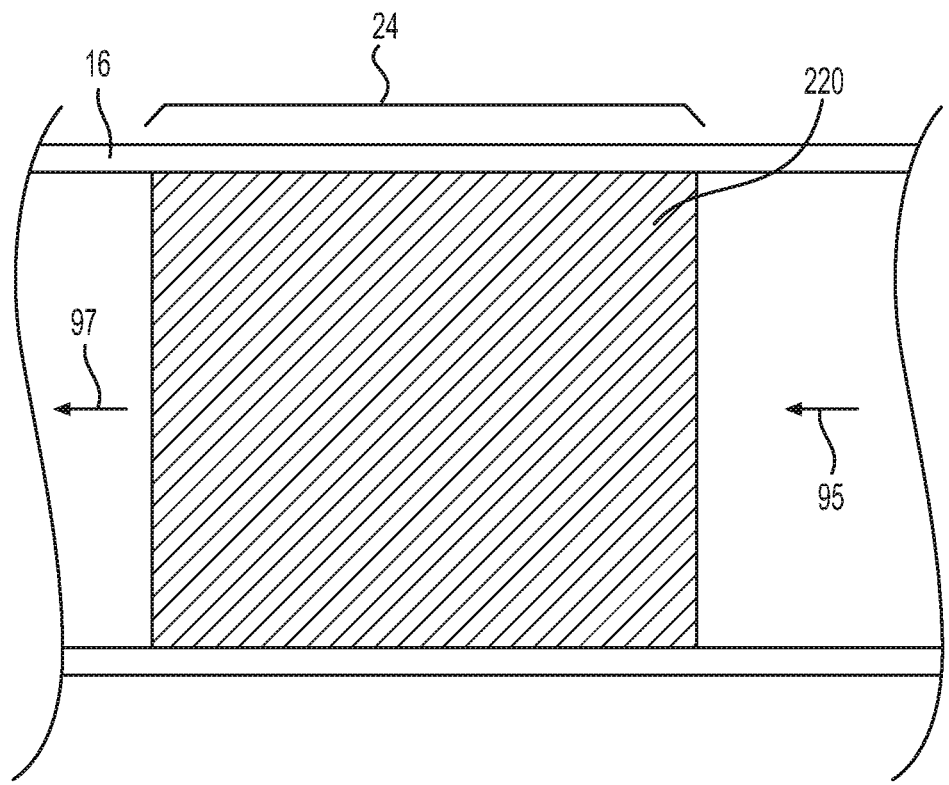
FIG. 2C is a plan view of an additive assembly according to some example embodiments.
Figure 2D:
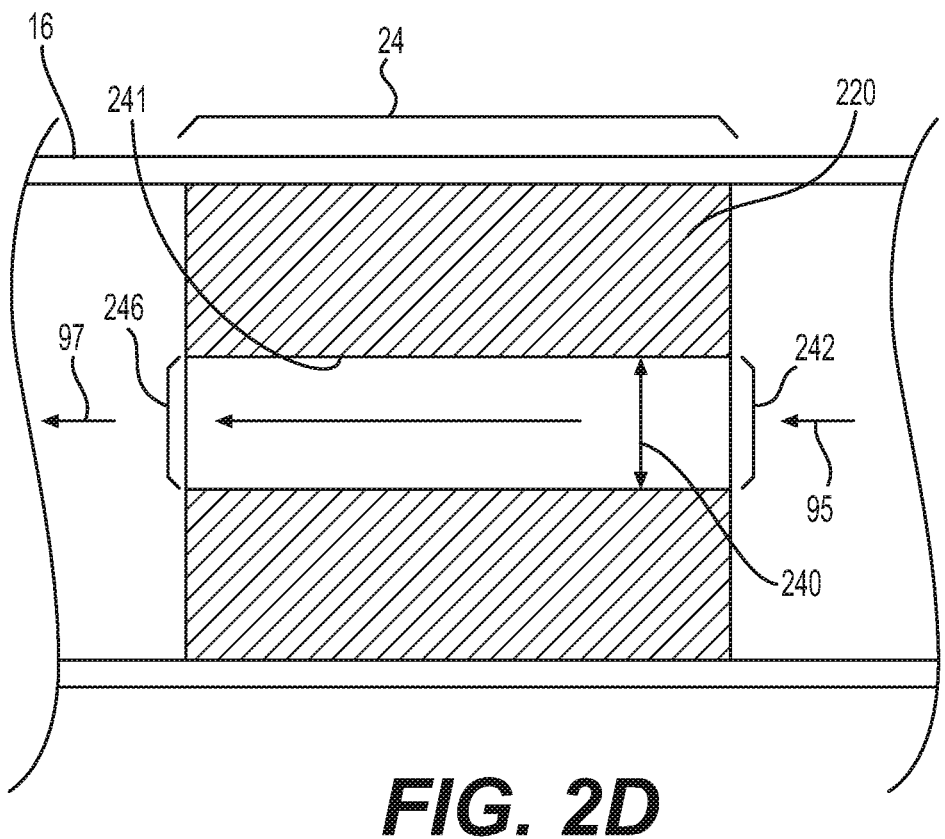
FIG. 2D is a plan view of an additive assembly according to some example embodiments.

FIG. 2A is a plan view of an additive assembly 24 according to some example embodiments. FIG. 2B is a plan view of an additive assembly 24 according to some example embodiments. FIG. 2C is a plan view of an additive assembly 24 according to some example embodiments. FIG. 2D is a plan view of an additive assembly 24 according to some example embodiments. Each of the example embodiments of the additive assembly 24 shown in FIG. 2A, FIG. 2B, FIG. 2C, and FIG. 2D may be included in any of the embodiments included herein, including the additive assembly 24 shown in FIG. 1B.

In some example embodiments, the additive assembly 24 includes one or more adsorbent materials on which carbon dioxide is adsorbed. The additive assembly 24 may be configured to release the carbon dioxide into a generated vapor 95 to form a flavored vapor 97, based on one or more elements of the generated vapor 95 adsorbing onto the adsorbent materials. The adsorbent materials may include one or more of a monolithic material, and a plurality of adsorbent material structures. An adsorbent material structure may include a bead structure, such that a plurality of adsorbent material structures may include a plurality of adsorbent beads.

In the example embodiments illustrated in FIG. 2A and FIG. 2B, for example, the additive assemblies 24 each include a plurality of adsorbent material beads 202 on which carbon dioxide 210 is adsorbed. An additive assembly 24 may include one or more various adsorbent materials configured to adsorb carbon dioxide. For example, one or more of the adsorbent material beads 202 may include at least one of zeolite, silica, activated carbon, and molecular sieves.

As shown in FIG. 2A and FIG. 2B, the additive assembly 24 may be configured to direct generated vapor 95 through the plurality of beads 202 to elute at least some of the carbon dioxide 210 into the generated vapor 95 to form the flavored vapor 97. The carbon dioxide 210 may be eluted into the generated vapor 95 based on desorption of the carbon dioxide 210 from one or more of the adsorbent material beads 202. The carbon dioxide 210 may be desorbed from an adsorbent material bead 202 based on one or more elements of the generated vapor 95 adsorbing on the adsorbent material of a bead 202 such that the carbon dioxide 210 is displaced from the adsorbent material.

In the example embodiments illustrated in FIGS. 2A-B, the carbon dioxide 210 is illustrated as being adsorbed on to the surfaces on an exterior of the adsorbent material beads 202. It will be understood that, in some example embodiments, the carbon dioxide 210 may be at least partially distributed throughout an interior of one or more adsorbent materials, including one or more adsorbent material beads 202. The carbon dioxide 210 may be adsorbed to internal surfaces, including one or more internal pore surfaces, in an interior of the adsorbent material and distributed into the interior of the adsorbent material. In some example embodiments, carbon dioxide 210 is both adsorbed on to one or more external surfaces of an adsorbent material, including one or more external pore surfaces, and adsorbed on to one or more internal surfaces, including one or more internal pore surfaces. The carbon dioxide 210 may thus be distributed throughout at least a portion of an interior of the adsorbent material in addition to being on an external surface of the adsorbent material.

In some example embodiments, the additive assembly 24 at least partially encloses the one or more adsorbent material structures in a containment structure. The containment structure may be configured to hold the one or more adsorbent material structures in a fixed volume. The containment structure may include one or more openings and may be configured to direct a generated vapor 95 through an interior of the containment structure to pass in fluid communication with one or more adsorbent material structures.

In the example embodiments illustrated in FIG. 2A and FIG. 2B, for example, the additive assembly 24 includes a containment structure 201 that at least partially encloses the adsorbent material beads 202. The containment structure 201 includes openings 212, 214 and is configured to direct the generated vapor 95 through opening 212 to elute carbon dioxide 210 into the generated vapor 95. The containment structure 201 may direct flavored vapor 97 out of the additive assembly 24 through opening 214. In some example embodiments, the containment structure 201 at least partially includes a mesh structure. For example, the containment structure 201 may include a mesh structure that covers at least one of openings 212, 214. The mesh structure may be partially permeable, such that the mesh structure is configured to direct vapor 95, 97 across the mesh and restrict at least the adsorbent material beads 202 from passing through one or more of the openings 212, 214.

In some example embodiments, the additive assembly 24 includes one or more flavor materials that hold one or more flavorants. The one or more flavor materials may release the one or more flavorants into the generated vapor 95 if and/or when the generated vapor 95 passes in fluid communication with the flavor materials.

An additive assembly 24 that includes an adsorbent material and a flavor material may be configured to release both carbon dioxide and one or more flavorants into the generated vapor 95 to form a flavored vapor 97. In the example embodiments illustrated in FIG. 2A and FIG. 2B, for example, the additive assemblies 24 include flavor materials 204, 206 in addition to the adsorbent material beads 202.

As shown in FIG. 2A and FIG. 2B, a flavor material may have one or more various shapes. For example, in the example embodiment illustrated in FIG. 2A, the flavor material 204 is a "shredded" material having a fibrous shape. The flavor material 204 extends between adsorbent material beads 202 throughout the interior of the additive assembly 24. In another example, in the example embodiment illustrated in FIG. 2B, the flavor material 206 is a bead-shaped material that is packed with the adsorbent material beads 202 into the additive assembly 24. In some example embodiments, one or more of the flavor materials 204, 206 included in an additive assembly includes at least one botanical substance, and the at least one botanical substance includes the flavorant.

In the illustrated example embodiments of FIG. 2A and FIG. 2B, the additive assemblies 24 each include a uniform or substantially uniform mixture of adsorbent material beads 202 and at least one of the flavor materials 204, 206. For example, in the illustrated example embodiment of FIG. 2B, the adsorbent material beads 202 and flavor material beads 206 are substantially uniformly mixed.

In some example embodiments, the mixture of adsorbent materials and flavor materials in the additive assembly 24 may be a non-uniform mixture. For example, a concentration of flavor materials in the additive assembly 24 may be greater with increased proximity to the opening 214, relative to the opening 212. As a result, a generated vapor 95 passing in fluid communication with the flavor materials may include carbon dioxide released from adsorbent material beads 202 that are closer to the opening 212 than the opening 214.

In some example embodiments, an adsorbent material included in the additive assembly 24 may be configured to generate heat based on one or more elements of generated vapor 95 adsorbing on the adsorbent material, such that the adsorbent material is configured to release both carbon dioxide and heat if and/or when one or more elements of the generated vapor 95 adsorb onto the adsorbent material. For example, an adsorbent material bead 202 may release heat based on one or more elements of the generated vapor 95 adsorbing onto the adsorbent material bead 202 and displacing at least some carbon dioxide 210 from the adsorbent material bead 202.

In some example embodiments, one or more flavor materials included in the additive assembly 24 are configured to absorb the heat generated by the adsorbent material included in the additive assembly 24. A flavor material may release an increased amount of flavorant, via elution into a generated vapor 95, based on an increased temperature of the flavor material. If and/or when the flavor material absorbs heat generated by adsorbent material in the additive assembly 24, the flavor material may release an increased amount of flavorant into the generated vapor 95, relative to an unheated flavor material.

In the example embodiments illustrated in FIG. 2A and FIG. 2B, the additive assembly 24 is configured to enable improved elution of flavorant into a generated vapor 95 based on elution of carbon dioxide 210 into the generated vapor 95. The additive material beads 202 included in the additive assemblies 24 shown in FIG. 2A and FIG. 2B are configured to generate heat based on adsorption of compounds from within the vapor 95. The generated heat may be absorbed by flavor materials 204, 206 to heat the flavor materials 204, 206. Flavorants may be eluted from the flavor materials 204, 206 into a generated vapor 95 passing in fluid communication with the additive assembly 24. The flavorant elution into the generated vapor 95 may be improved, relative to an additive assembly 24 in which the adsorbent material beads 202 are absent, based on the adsorbent material-generated heat that is absorbed by the flavor materials 204, 206.

Referring to FIG. 2C and FIG. 2D, in some example embodiments, an additive assembly 24 may include one or more structures that include at least one of adsorbent material and flavor material. Such one or more structures may be porous structures that include at least one of adsorbed carbon dioxide and one or more flavorants. The one or more structures may be configured to release at least one of carbon dioxide and one or more flavorants into a generated vapor 95 if and/or when the generated vapor 95 flows in fluid communication with the one or more structures.

Referring to the example embodiment illustrated in FIG. 2C, the additive assembly 24 includes a structure 220 configured to release at least carbon dioxide into a generated vapor 95 flowing in fluid communication with the structure 220. The structure 220 may be a porous structure configured to direct generated vapor 95 to flow through an interior of the structure 220. Carbon dioxide may be adsorbed on at least a portion of the internal structure of the structure 220. Carbon dioxide may be desorbed from the internal structure of the structure 220 based on one or more elements of the generated vapor 95 adsorbing on the internal structure of the structure 220.

In some example embodiments, the structure 220 may hold one or more flavorants within an internal structure of the structure 220. The structure 220 may be configured to enable elution of one or more flavorants into a generated vapor 95 flowing through the internal structure of structure 220.

In some example embodiments, the additive assembly 24 may include multiple structures 220. Separate structures 220 may include different ones of an adsorbent material holding adsorbed carbon dioxide and a flavor material holding one or more flavorants. For example, an additive assembly 24 may include a first structure 220 that is proximate to the vaporizer assembly 22 and a second structure 220 that is distal from the vaporizer assembly 22. The first structure 220 may include an adsorbent material on which carbon dioxide is adsorbed, and the second structure 220 may include a flavor material holding one or more flavorants. A generated vapor 95 formed by the vaporizer assembly 95 may first flow in fluid communication with the first structure 220 to elute carbon dioxide from the first structure 220 and carry heat generated by adsorbent material included in the first structure 220. The generated vapor 95 may then flow in fluid communication with the second structure 220 and transfer the carried heat to the second structure 220. The generated vapor 95 may elute one or more flavorants from the second structure 220, where flavorant elution is based at least in part upon the heat transferred to the second structure 220.

In some example embodiments, the structure 220 may be configured to release one or more of carbon dioxide and one or more flavorants into a generated vapor 95 flowing in fluid communication with an outer surface of the structure 220. For example, the structure 220 may be configured to direct the generated vapor 95 to flow around one or more outer surfaces of the structure 220. The structure 220 may include at least one of carbon dioxide adsorbed to an outer surface and one or more flavorants that may be eluted through an outer surface.

In some example embodiments, the additive assembly 24 may include a structure 220 that includes one or more internal passages through which a generated vapor 95 may flow. At least one of carbon dioxide and one or more flavorants may be released into a generated vapor 95 through the one or more internal passages. In the example embodiment illustrated in FIG. 2D, for example, the structure 220 defines an internal passage 240 having openings 242, 244. The structure 220 shown in FIG. 2D may be configured to direct generated vapor 95 to enter the passage 240 through opening 242 and exit the passage 240 through opening 244.

In some example embodiments, a portion of the structure 220 that defines an interior surface 241 of the passage 240 may include an adsorbent material on which carbon dioxide may be adsorbed. The structure 220 may be configured to desorb the carbon dioxide into a generated vapor 95 passing through the passage 240 to form the flavored vapor 97, based on one or more elements of the generated vapor 95 adsorbing onto the one or more portions of the structure 220 that define the interior surface 241 of the passage 240.

In some example embodiments, a portion of the structure 220 that defines an interior surface 241 of the passage 240 may include a flavor material holding one or more flavorants. The structure 220 may be configured to release the one or more flavorants into a generated vapor 95 passing through the passage 240 to form the flavored vapor 97.

In some example embodiments, an additive assembly 24 may include multiple adsorbent materials. In some example embodiments, an additive assembly 24 may include multiple passages 240. In some example embodiments, at least one of the passages 240 may include one or more adsorbent materials configured to adsorb carbon dioxide, and at least one of the passages 240 may include one or more flavor materials configured to hold one or more flavorants.

Figure 3:
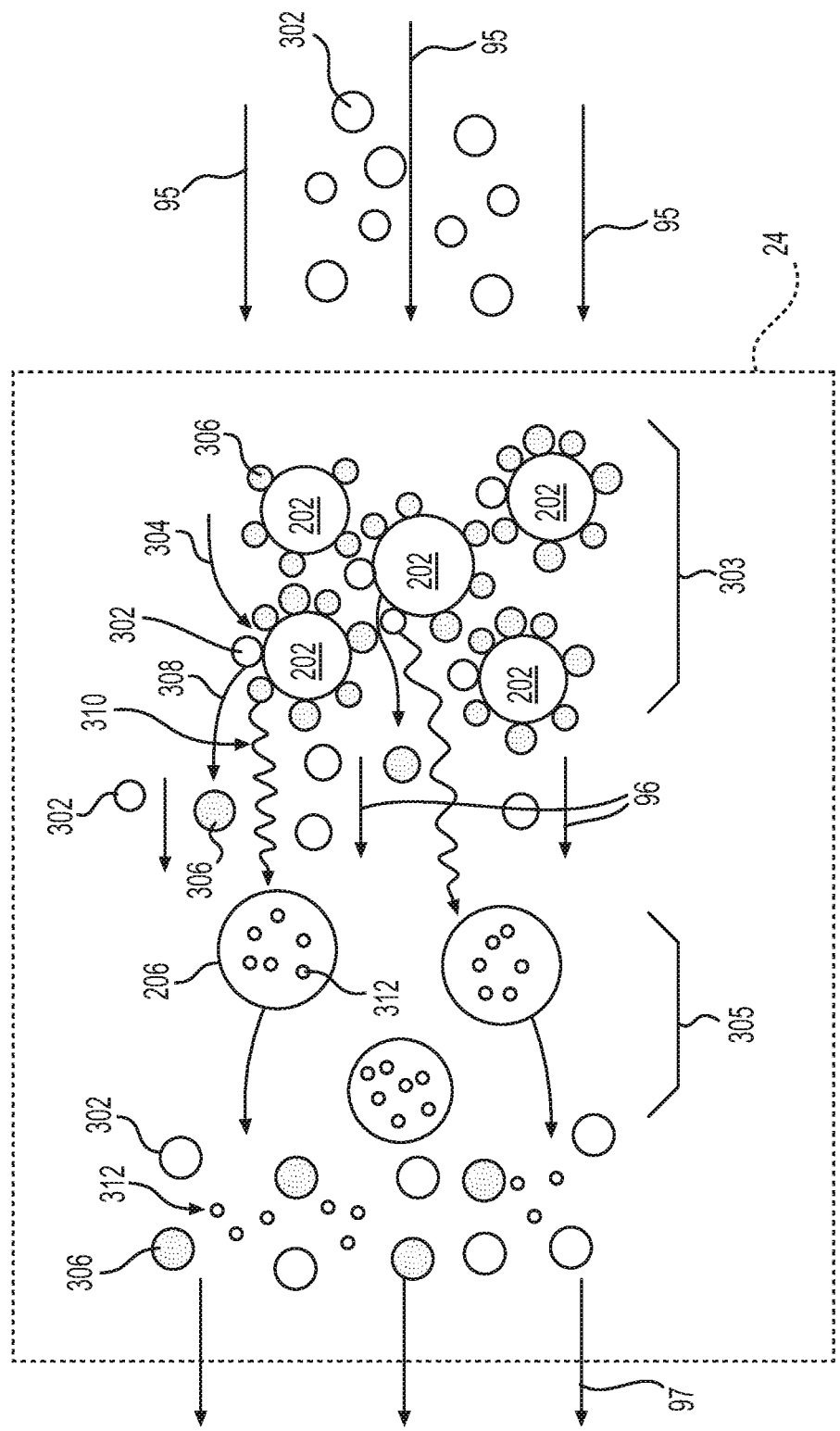
FIG. 3 is a schematic illustration of the adsorbent material and flavor material included in an additive assembly releasing carbon dioxide and flavorant into a generated vapor to form a flavored vapor.

FIG. 3 is a schematic illustration of the adsorbent material and flavor material included in an additive assembly releasing carbon dioxide and flavorant into a generated vapor to form a flavored vapor. The example embodiment of the additive assembly 24 shown in FIG. 3 may be included in any of the embodiments included herein, including the additive assembly 24 shown in FIG. 1B.

In some example embodiments, an additive assembly 24 includes at least one adsorbent material 303 and at least one flavor material 305. In the example embodiment illustrated in FIG. 3, the adsorbent material 303 includes a plurality of adsorbent material beads 202. In the example embodiment illustrated in FIG. 3, the adsorbent material 303 includes carbon dioxide 306 adsorbed on one or more external and internal pore surfaces of the adsorbent material beads 202. The flavor material 305 includes one or more flavor material beads 206 holding at least the flavorants 312. In some example embodiments, the one or more flavorants 312 are held within external and internal pore surfaces of the flavor material beads 206. A desorption pathway, adsorption pathway, displacement pathway, some combination thereof, or the like with regard to an adsorbent material may include a process that occurs at the molecular level at the adsorption sites of the adsorbent material.

The example embodiment illustrated in FIG. 3 further shows that the adsorbent material 303 is closer to a source of generated vapor (e.g., at least one of vaporizer assembly 22 and space 40 illustrated in FIG. 1B) than the flavor material 305. However, it will be understood that, in some example embodiments, the additive assembly 24 may include a uniform or substantially uniform mixture of adsorbent material 303 and flavor material 305.

The additive assembly 24 may be configured to release carbon dioxide 306 into a generated vapor 95 that flows in fluid communication with the adsorbent material 303, based at least in part upon one or more elements of the generated vapor 95 adsorbing on one or more structures of the adsorbent material 303 to desorb the carbon dioxide. The adsorbent material 303 may further generate and release heat 310 based on the one or more elements of the generated vapor 95 adsorbing on the one or more structures of the adsorbent material 303 to desorb the carbon dioxide. One or more elements or compounds within the vapor 95 may be adsorbed by the adsorbent, based on at least one of the relative binding energies of the one or more elements or compounds and/or the relative affinities of the one or more elements or compounds for one or more specific adsorbents.

As shown in FIG. 3, a generated vapor 95 may flow in fluid communication with the adsorbent material beads 202 such that one or more elements 302 of the generated vapor 95 adsorb 304 onto the adsorbent material beads 202 to desorb 308 at least some of the carbon dioxide 306 from the adsorbent material beads 202. The carbon dioxide 306 may be desorbed based on displacement from the adsorbent material beads 202 by the one or more elements 302 of the generated vapor 95. The one or more elements 302 of the generated vapor 95 may include at least one of water, beads, solvents, active ingredients, ethanol, plant extracts, natural or artificial flavors, and one or more pre-vapor formulations. A pre-vapor formulation may include at least one of glycerin and propylene glycol.

As shown in FIG. 3, the desorbed 308 carbon dioxide 306 may be eluted into the generated vapor 95 to form a modified vapor 96. The modified vapor 96 includes one or more elements 302 of the generated vapor 95 and at least some of the desorbed carbon dioxide 306.

As shown in FIG. 3, the adsorbent material 303 may, in addition to releasing carbon dioxide 306 through desorption 308, generate heat 310 based on one or more elements 302 of the generated vapor 95 adsorbing onto the adsorbent material beads 202. The heat 310 may be absorbed by one or more of the flavor material beads 206 included in the flavor material 305. The heat may be transferred to the flavor material 305 through one or more of conduction, convection, and radiation. For example, if and/or when the flavor material beads 206 and adsorbent material beads 202 are in physical contact, the generated heat 310 may be transferred from the adsorbent material beads 202 to the flavor material beads 206 through conduction. In another example, the heat 310 may be transferred to at least some of the flavor material beads 206 by the modified vapor 96 through convection. In some example embodiments, heat generated in the system may facilitate (enable) the release of a greater amount of flavorant to modified vapor 96. Some flavorant mays transfer to stream 96 through an elution/entrainment type of mechanism (e.g., a concentration driven mechanism and/or concentration gradient between the flavorant carrier and the passing vapor). Such a transfer may occur even in the absence of heat generation at the adsorbent material beads 202 and absorption at flavor material 305.

The flavor material 305 included in the additive assembly 24 may be configured to release one or more flavorants into a vapor flowing in fluid communication with the flavor material 305 based at least in part upon absorbing the heat 310 generated by the adsorbent material beads 202. Based on the flavor material 305 and the adsorbent material beads 202, the additive assembly 24 may be configured to form a flavored vapor 97 that includes both carbon dioxide and one or more flavorants.

As shown in FIG. 3, the flavor material beads 206 may release the one or more flavorants 312 based at least in part upon absorbing at least some of the heat 310 generated by the adsorbent material beads 202. At least one of the rate of flavorant 312 released by the flavor material 305 and the amount of flavorant 312 released by the flavor material 305 may vary in direct proportion to the amount of heat 310 absorbed by the flavor material 305. As a result, the flavor material 305 may be configured to release more flavorant 312 into a vapor 95, 96 passing in fluid communication with the flavor material 305 if and/or when the flavor material 305 absorbs heat 310 from the adsorbent material beads 202, relative to the amount of flavorant 312 released by the flavor material 305 into a vapor 95, 96 in the absence of absorbing such heat 310. Thus, flavorant 312 elution from the flavor material 305 may be augmented by the flavor material 305 absorbing the heat 310 generated by the adsorbent material beads 202.

As shown in FIG. 3, if and/or when the flavorants 312 are released from the flavor material 206 into a modified vapor 96, the flavorants 312 may mix with the modified vapor 96 to form a flavored vapor 97. The flavored vapor 97 may include one or more generated vapor elements 302, carbon dioxide 310 released by the adsorbent material 303, and flavorants 312 released by the flavor material 305. The flavored vapor 97 may exit the additive assembly 24.

Figure 4:
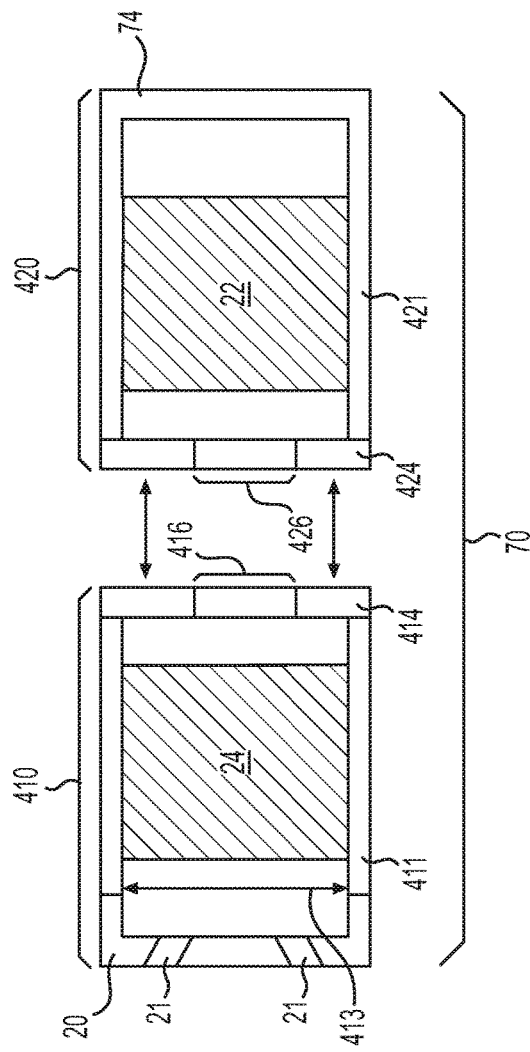
FIG. 4 is a cross-sectional view of an additive assembly module and a vaporizer assembly module according to some example embodiments.

FIG. 4 is a cross-sectional view of an additive assembly module and a vaporizer assembly module according to some example embodiments. The cartridge 70 shown in FIG. 4 may be included in any of the embodiments included herein, including the cartridge 70 of the e-vaping device 60 shown in FIG. 1A and FIG. 1B. In some example embodiments, the cartridge 70 shown in FIG. 4 may be coupled with a power supply section 72 illustrated in FIG. 1A and FIG. 1B to form an e-vaping device 60.

In some example embodiments, a cartridge 70 may include multiple modules that may be coupled together to configure the cartridge to provide a flavored vapor. The additive assembly may be included in an additive assembly module. The additive assembly module may be configured to be removably coupled to a vaporizer assembly module. The vaporizer assembly module may include a vaporizer assembly. The additive assembly module may be decoupled from the vaporizer assembly module, swapped for a different additive assembly module, etc. Different additive assembly modules may include different additive assemblies, different flavorants, different adsorbent materials, different flavor materials, different additive assembly structures, some combination thereof, etc. Different additive assemblies may be configured to form different flavored vapors, modified vapors, some combination thereof, etc. associated with different mixtures of a generated vapor with one or more flavors, carbon dioxide, some combination thereof, etc. As a result, swapping different additive assemblies in a cartridge may enable an adult vaper to swap one or more flavors, adsorbent materials, etc. associated with the flavored vapors provided to the adult vaper during vaping independently of swapping entire cartridges, thereby improving the sensory experience of the adult vaper during vaping.

As shown in FIG. 4, a cartridge 70 may include an additive assembly module 410 and a vaporizer assembly module 420. Modules 410, 420 may be coupled together via complimentary, respective interfaces 414, 424. It will be understood that the interfaces 414, 424 may include any of the types of interfaces described herein. Each module 410, 420 may include a respective housing 411, 421.

The vaporizer assembly module 420 may include a vaporizer assembly 22 within the housing 421. The vaporizer assembly 22 shown in FIG. 4 may be the vaporizer assembly 22 illustrated in FIG. 1B.

As shown in FIG. 4, the interface 424 of module 420 may include a conduit 426, such that the vaporizer assembly 22 held within the housing 421 of the module 420 is held in fluid communication with an exterior of the module 420. The vaporizer assembly module 420 may include a cartridge interface 74 at one end distal from the interface 424. The cartridge interface 74 may be configured to electrically couple the vaporizer assembly 22 with a power supply included in a separate power supply section of an e-vaping device.

The additive assembly module 410 may include an additive assembly 24 within the housing 411. The additive assembly 24 shown in FIG. 4 may be the additive assembly 24 shown in any of FIG. 1B, FIG. 2A, FIG. 2B, FIG. 2C, FIG. 2D, and FIG. 3.

As shown in FIG. 4, the interface 414 of module 410 may include a conduit 416. The conduit 416 may extend between the interface 414 and the interior of the housing 411, such that the additive assembly 24 held within the housing 411 of the module 410 is held in fluid communication with an exterior of the module 410 through the conduit 416. The interior of the housing 411 may be referred to herein as an additive assembly compartment 413. The additive assembly module 410 may include an outlet end insert 20 at an outlet end of the module 410 and a set of one or more outlet ports 21 in the outlet end insert 20.

As shown in FIG. 4, if and/or when the modules 410, 420 are coupled via interfaces 414, 424, the modules 410, 420 may form a cartridge 70, where the cartridge includes an outlet end insert 20 at an outlet end and an interface 74 at a tip end. The cartridge 70 may further include the additive assembly 24 being held in fluid communication with the vaporizer assembly 22 via a conduit that includes at least one of the coupled conduits 416, 426 of the coupled interfaces 414, 424. For example, in some example embodiments, the additive assembly 24 is held in fluid communication with the vaporizer assembly 22 via the conduit 416 if and/or when interfaces 414, 424 are coupled together. The cartridge 70 may further include the additive assembly 24 being in fluid communication with the outlet ports 21, such that generated vapor formed by the vaporizer assembly 22 may pass out of the cartridge 70 by following a pathway extending through the additive assembly 24 to the outlet ports 21. The additive assembly compartment 413 within the housing 411 may direct generated vapor received into the additive assembly compartment 413 to pass through the additive assembly 24.

As shown in FIG. 4, the additive assembly module 410 may be configured to restrict fluid communication through the module 410 to be through the additive assembly 24, such that generated vapor passing from the vaporizer assembly 22 to the outlet ports 21 in the formed cartridge 70 are restricted to passing through the additive assembly 24. The module 410 housing 411 may be sized to establish physical contact with the outer surfaces of the additive assembly 24.

In some example embodiments, the cartridge 70 includes an opening via which an additive assembly 24 may be inserted or removed from the module 410. The cartridge 70 may include a hatch (not shown) which may be operable to selectively expose or seal the module 410 interior from an exterior environment to enable the additive assembly 24 to selectively seal the module 410 interior from the exterior environment based on the additive assembly 24 being inserted into the module 410 interior.

The additive assembly module 410 may be configured to be removably coupled with the module 420, so that additive assembly modules 410 may be swapped from the module 420.

Figure 5:
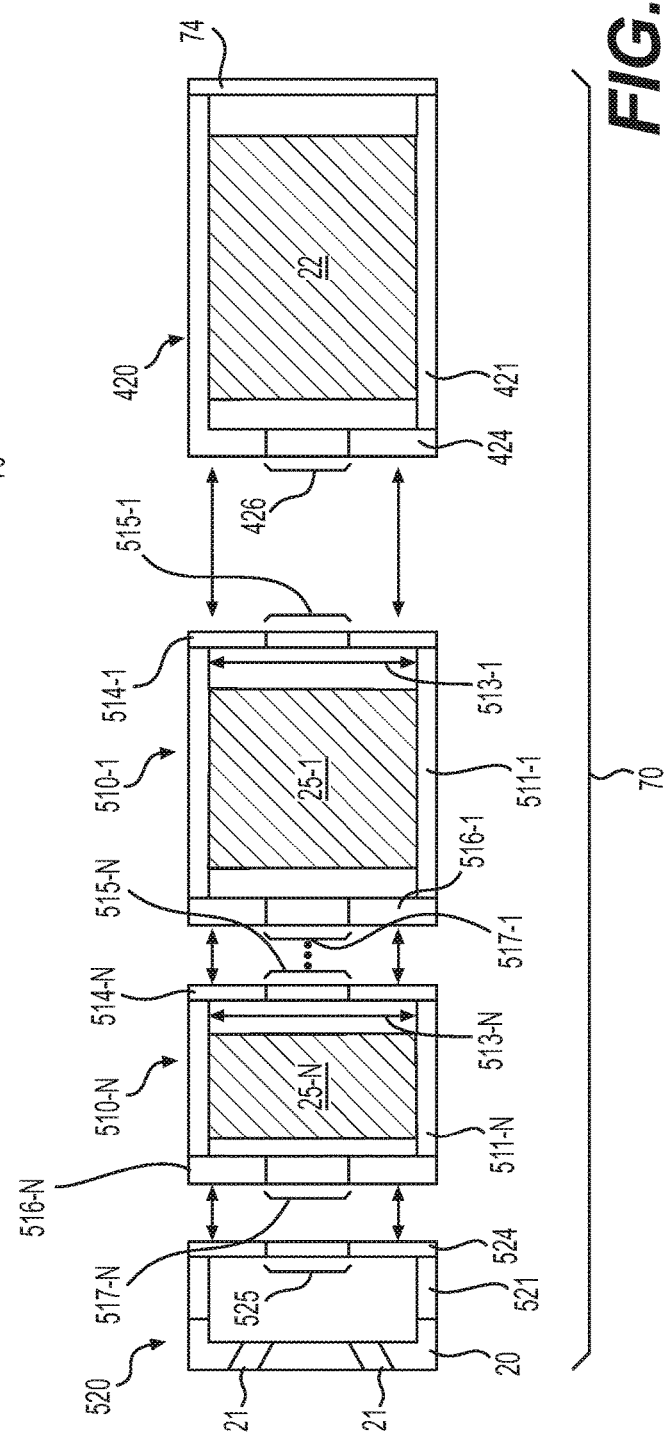
FIG. 5 is a cross-sectional view of multiple additive assembly modules and a vaporizer assembly module according to some example embodiments.

FIG. 5 is a cross-sectional view of multiple additive assembly modules and a vaporizer assembly module according to some example embodiments. The cartridge 70 shown in FIG. 5 may be included in any of the embodiments included herein, including the cartridge 70 of the e-vaping device 60 shown in FIG. 1A and FIG. 1B. In some example embodiments, the cartridge 70 shown in FIG. 5 may be coupled with a power supply section 72 illustrated in FIG. 1A and FIG. 1B to form an e-vaping device 60.

In some example embodiments, a cartridge 70 may include multiple modules that may be coupled together to configure the cartridge to provide a flavored vapor. The multiple modules may include multiple, separate additive assembly modules that each include a separate additive assembly. The multiple, separate additive assembly modules may be configured to be coupled together to provide a flavored vapor based on a generated vapor passing through each of the separate additive assembly modules. The separate additive assembly modules may be removably coupled together, such that an adult vaper may swap additive assembly modules to control the flavorants, gasses, etc. included in the flavored vapor formed by the additive assemblies included in the cartridge 70.

As shown in FIG. 5, a cartridge 70 may include additive assembly modules 510-1 to 510-N and a vaporizer assembly module 420. As also show, the cartridge 70 may, in some example embodiments, include an outlet end insert module 520. Modules 420, 510-1 to 510-N, and 520 may be coupled together via complimentary interfaces 424, 514-1 to 514-N, 516-1 to 516-N, and 524. It will be understood that the interfaces may include any of the types of interfaces described herein. Each module 420, 510-1 to 510-N, and 520 may include a respective housing 421, 511-1 to 511-N, and 521.

The additive assembly modules 510-1 to 510-N may include separate additive assemblies 25-1 to 25-N within the respective additive assembly compartments 513-1 to 513-N thereof. The compartments 513-1 to 513-N may be at least partially defined by the respective housings 411-1 to 411-N. Each of the additive assemblies 25-1 to 25-N shown in FIG. 5 may be the additive assembly 24 shown in any of FIG. 1B, FIG. 2A, FIG. 2B, FIG. 2C, FIG. 2D, and FIG. 3.

As shown in FIG. 5, the additive assembly modules 510-1 to 510-N include respective pairs of interfaces 514-1, 516-1 to 514-N, 516-N at opposite ends. The interfaces 514-1 to 514-N may be configured to be interchangeably and removably coupled to any of the interfaces 516-1 to 516-N. One or more of interfaces 516-1 to 516-N may be interchangeably and removably coupled to interface 525 of module 520. One or more of interfaces 514-1 to 514-N may be interchangeably and removably coupled to interface 424 of module 420. As a result, the modules 510-1 to 510-N may be interchangeably and removably coupled together in one or more various combinations and configurations.

Each of the additive assembly module interfaces 514-1 to 514-N may include a respective conduit 515-1 to 515-N, and each of the additive assembly module interfaces 516-1 to 516-N may include a respective conduit 517-1 to 517-N, such that each of the additive assemblies 25-1 to 25-N held within the housing of each module 510-1 to 510-N is held in fluid communication with an exterior of the respective module 510-1 to 510-N through the conduits 514-1, 516-1 to 514-N, 516-N of the respective module 510-1 to 510-N.

As shown in FIG. 4, if and/or when the modules 420, 510-1 to 510-N, and 520 are coupled together, the modules 420, 510-1 to 510-N, and 520 may form a cartridge 70, where the cartridge includes an outlet end insert 20 at an outlet end and an interface 74 at a tip end. The cartridge 70 may further include the additive assemblies 25-1 to 25-N being held in fluid communication with the vaporizer assembly 22 via one or more sets of conduits that include at least one of the coupled conduits 426, 515-1 to 515-N, 517-1 to 517-N, 525 of the respective coupled interfaces 424, 514-1 to 514-N, 516-1 to 516-N, and 524.

Figure 6A:
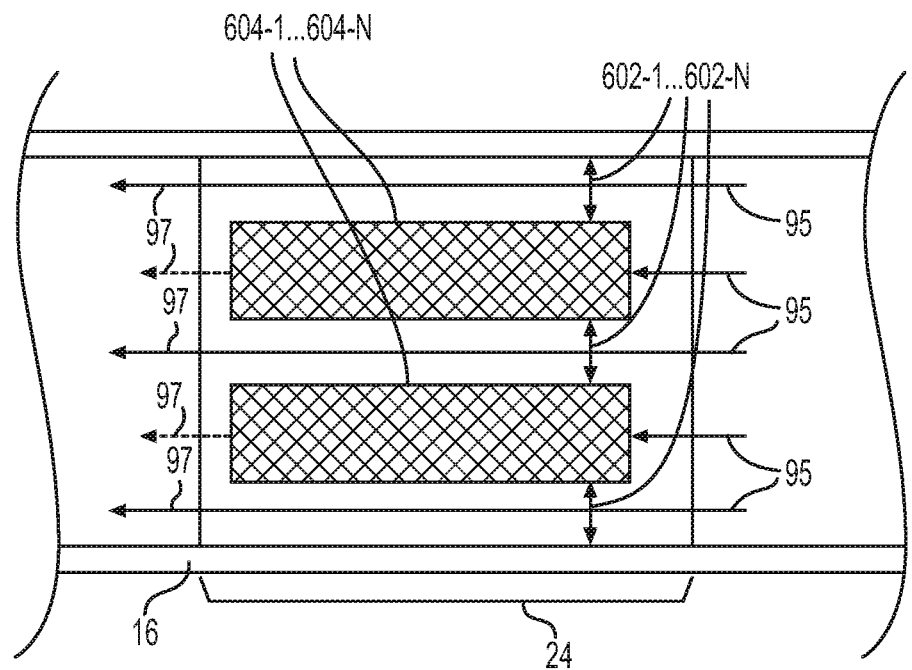
FIG. 6A is a cross-sectional view of an additive assembly that includes multiple additive structures according to some example embodiments.

FIG. 6A is a cross-sectional view of an additive assembly 24 that includes multiple additive structures according to some example embodiments. The additive assembly 24 shown in FIG. 6A may be included in any of the embodiments included herein, including the additive assembly 24 shown in FIG. 1B.

In some example embodiments, an additive assembly 24 includes multiple additive structures 604-1 to 604-N. The additive assembly 24 may include a configuration of multiple additive structures 604-1 to 604-N that collectively define one or more passages through the additive assembly 24. The additive assembly 24 may be configured to direct a generated vapor 95 through one or more of the passages 602-1 to 602-N to flow in fluid communication with one or more surfaces of the additive structures 604-1 to 604-N.

As shown in FIG. 6A, additive assembly 24 includes additive structures 604-1 to 604-N. The additive structures 604-1 to 604-N may each include at least one of an adsorbent material and a flavor material. Different additive structures may include different materials. For example, additive structure 604-1 may include an adsorbent material on which carbon dioxide is adsorbed and additive structure 604-N may include a flavor material holding at least one flavorant.

In some example embodiments, one or more of the additive structures 604-1 to 604-N is a monolithic structure that restricts generated vapor 95 to flow along an outer surface of the respective one or more additive structures 604-1 to 604-N.

As further shown in FIG. 6A, the additive structures 604-1 to 604-N may be positioned in the additive assembly 24 in a configuration such that the additive structures 604-1 to 604-N at least partially define one or more passages 602-1 to 602-N through the additive assembly 24. The additive assembly 24 shown in FIG. 6A may direct a generated vapor 95 entering the additive assembly 24 to flow through at least one of the passages 602-1 to 602-N such that the generated vapor 95 flows in fluid communication with an outer surface of at least one of the additive structures 604-1 to 604-N.

Based on directing at least a portion of the generated vapor 95 to flow through one or more passages in fluid communication with an outer surface of one or more additive structures 604-1 to 604-N, the additive assembly 24 may enable improved release of at least one of flavorant and carbon dioxide into the generated vapor 95. For example, based on including multiple additive structures 604-1 to 604-N configured to define multiple passages 602-1 to 602-N through the additive assembly 24, the additive assembly 24 may include a greater additive structure outer surface area, relative to an additive assembly 24 that includes an individual additive structure 604-1. Based on including such an increased outer surface area, the additive assembly 24 shown in FIG. 6A may be configured to provide improved release of one or more additives into a generated vapor 95 flowing in fluid communication with the one or more additive structures 604-1 to 604-N.

Figure 6B:
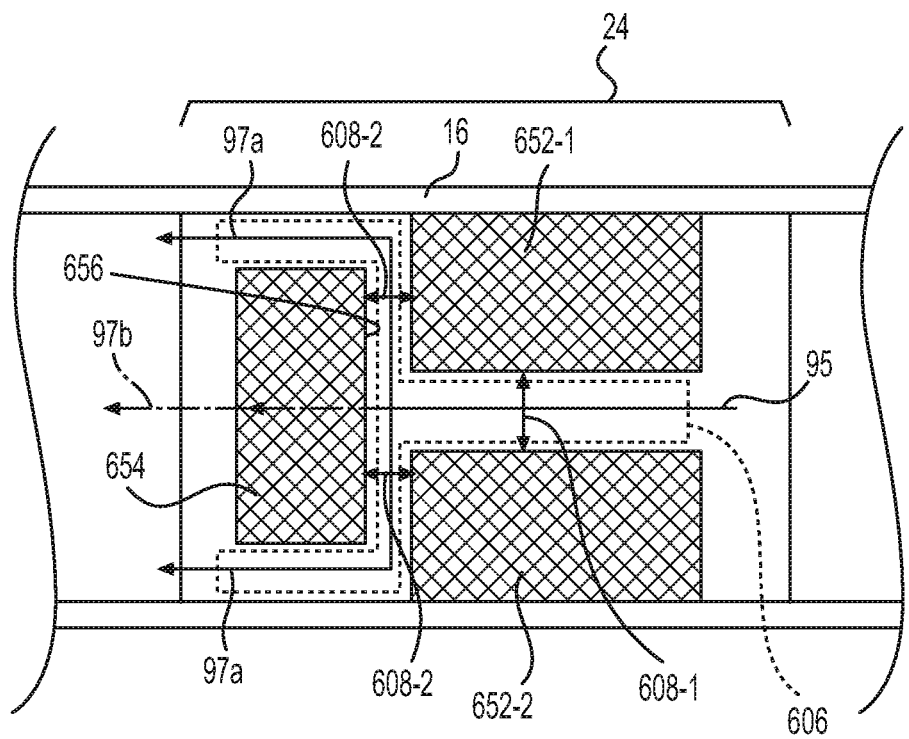
FIG. 6B is a cross-sectional view of an additive assembly that includes multiple additive structures according to some example embodiments.

FIG. 6B is a cross-sectional view of an additive assembly 24 that includes multiple additive structures 652-1 to 652-2 and 654 according to some example embodiments. The additive assembly 24 shown in FIG. 6B may be included in any of the embodiments included herein, including the additive assembly 24 shown in FIG. 1B.

In some example embodiments, an additive assembly 24 may include a configuration of multiple additive structures that collectively define one or more passages through the additive assembly 24. The one or more passages may include portions having different orientations. A vapor flowing through the one or more passages may change direction based on flowing through differently-oriented passage portions. If and/or when a vapor flows from a first passage portion having a first orientation to another passage portion having a different orientation, the vapor may impinge on an outer surface of an additive structure. Additive release from the additive structure may be improved, based on the impingement.

As shown in FIG. 6B, additive assembly 24 includes a configuration of additive structures 652-1 to 652-2 and 654 that collectively define a passage 606 through the additive assembly 24. The passage 606 includes portions having portions 608-1 and 608-2.

Additive structures 652-1 to 652-2 define a first portion 608-1 of the passage 606 through the additive assembly 24. The first portion 608-1 of the passage 606 is oriented to extend in parallel or substantially in parallel with a longitudinal axis of the additive assembly 24.

Additive structures 652-1 to 652-2 and 654 at least partially define portions 608-2 of the passage 606. Portions 608-2 are oriented to extend orthogonally or substantially orthogonally to the longitudinal axis of the additive assembly 24. As shown, the passage 606 first portion 608-1 extends orthogonally or substantially orthogonally to an outer surface 656 of the additive structure 654.

Based on the orientations of portions 608-1 and 608-2 of the passage 606, a generated vapor 95 flowing through the passage 606 from portion 608-1 to one of the portions 608-2 may impinge upon the outer surface 656 of the additive structure 654.

In some example embodiments, the additive structure 654 may divert at least a portion of the impinging generated vapor 95 to flow through portions 608-2 of the passage 606 such that the generated vapor 95 flows in fluid communication with one or more outer surfaces 656 of the additive structure 654. Based on the generated vapor 95 impinging upon the additive structure 654 outer surface 656, additive release from the additive structure 654 into the generated vapor to form a flavored vapor 97a may be improved.

In some example embodiments, the additive structure 654 is a porous structure, such that at least a portion of the generated vapor 95 impinging on surface 656 may flow through the additive structure 654 to form a flavored vapor 97b.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. An additive assembly for an electronic vaping device (EVD), the additive assembly comprising:
   an adsorbent material including adsorbed carbon dioxide, the adsorbent material configured to release the carbon dioxide into a vapor based on at least a portion of the vapor adsorbing on the adsorbent material, the adsorbent material further configured to generate heat based on the portion of the vapor adsorbing on the adsorbent material; and
   a flavor material including a flavorant, the flavor material configured to release the flavorant into the vapor based at least in part on absorbing the heat generated by the adsorbent material,
   wherein the adsorbent material is a plurality of adsorbent beads, and
   wherein the adsorbent material and the flavor material are present in a mixture within the additive assembly such that the flavor material is between adjacent adsorbent beads.

2. The additive assembly of claim 1, wherein the flavor material includes a plurality of beads, and each of the beads includes the flavorant.

3. The additive assembly of claim 1, wherein the flavor material includes at least one botanical substance, and the at least one botanical substance includes the flavorant.

4. The additive assembly of claim 1, wherein
   the additive assembly includes at least first, second, and third additive structures,
   the first, second, and third additive structures each include at least one material of the adsorbent material and the flavor material,
   the first, second, and third additive structures include separate, respective first, second, and third partially permeable containment structures,
   the first, second, and third partially permeable containment structures each define a separate fixed volume and hold the at least one material within the separate fixed volume and are configured to restrict the at least one material from exiting the separate fixed volume,
   respective outer surfaces of the first and second partially permeable containment structures at least partially define a boundary of a first portion of a passage between the first and second additive structures,
   the first portion of the passage at least partially extends parallel to a longitudinal axis of the additive assembly,
   the first and second partially permeable containment structures are configured to direct at least a portion of the vapor through the first portion of the passage,
   the third additive structure includes an orthogonal outer surface configured to extend orthogonally to the first portion of the passage, such that the portion of the vapor flowing through the first portion of the passage impinges upon the orthogonal outer surface of the third additive structure,
   respective outer surfaces of the first, second, and third partially permeable containment structures at least partially define a boundary of a second portion of the passage between the third additive structure and the first and second additive structures,
   the second portion of the passage at least partially extends orthogonal to the first portion of the passage, and
   the first, second, and third partially permeable containment structures are configured to enable at least a portion of the vapor impinging on the orthogonal outer surface of the third additive structure to flow through the second portion of the passage.

5. The additive assembly of claim 1, wherein the adsorbent material includes at least one of zeolite, silica, activated carbon, and molecular sieves.

6. An e-vaping device, comprising:
   a vaporizer assembly configured to form a generated vapor; and
   the additive assembly of claim 1 in fluid communication with the vaporizer assembly; and
   a power supply section configured to selectively supply power to the vaporizer assembly.

7. The e-vaping device of claim 6, further comprising:
   a vaporizer assembly module and at least one additive module, the vaporizer assembly module being removably coupled to the at least one additive module, the vaporizer assembly module including the vaporizer assembly, the at least one additive module including the additive assembly.

8. The e-vaping device of claim 7, further comprising:
   a plurality of additive modules removably coupled together, each of the additive modules including a separate one of the adsorbent material and the flavor material.

9. The e-vaping device of claim 8, wherein
   the additive assembly includes at least a first and second additive structures;
   the first and second additive structures include at least one of the adsorbent material and the flavor material; and
   the first and second additive structures at least partially define a boundary of at least one passage between the first and second additive structures.

10. The e-vaping device of claim 6, wherein the power supply section includes a rechargeable battery.

11. The additive assembly of claim 1, wherein at least one of the adsorbent material and the flavor material is distributed substantially uniformly throughout the mixture.

12. The additive assembly of claim 1, wherein at least one of the adsorbent material and the flavor material is distributed substantially non-uniformly throughout the mixture.

13. An additive assembly for an electronic vaping device (EVD), the additive assembly comprising:
   A first, second, and third additive structures, each additive structure of the first, second, and third additive structures including at least one material of an adsorbent material including adsorbed carbon dioxide and a flavor material, wherein the adsorbent material is configured to release carbon dioxide into a vapor based on at least a portion of the vapor adsorbing on the adsorbent material, and generate heat based on the portion of the vapor adsorbing on the adsorbent material, wherein the flavor material includes a flavorant, the flavor material configured to release the flavorant into the vapor based at least in part on absorbing the heat generated by the adsorbent material, the first, second, and third additive structures include separate, respective first, second, and third partially permeable containment structures, the first, second, and third partially permeable containment structures each define a separate fixed volume and hold the at least one material within the separate fixed volume and are configured to restrict the at least one material from exiting the separate fixed volume, respective outer surfaces of the first and second partially permeable containment structures at least partially define a boundary of a first portion of a passage between the first and second additive structures, the first portion of the passage at least partially extends parallel to a longitudinal axis of the additive assembly, the first and second partially permeable containment structures are configured to direct at least a portion of the vapor through the first portion of the passage, the third additive structure includes an orthogonal outer surface configured to extend orthogonally to the first portion of the passage, such that the portion of the vapor flowing through the first portion of the passage impinges upon the orthogonal outer surface of the third additive structure, respective outer surfaces of the first, second, and third partially permeable containment structures at least partially define a boundary of a second portion of the passage between the third additive structure and the first and second additive structures, the second portion of the passage at least partially extends orthogonal to the first portion of the passage, and the first, second, and third partially permeable containment structures are configured to enable at least a portion of the vapor impinging on the orthogonal outer surface of the third additive structure to flow through the second portion of the passage.

14. The additive assembly of claim 13, wherein the first, second, and third partially permeable containment structures each include a mesh structure.

* * * * *